US012671071B2

(12) United States Patent
Hagedorn et al.

(10) Patent No.: US 12,671,071 B2
(45) Date of Patent: Jun. 30, 2026

(54) PROCESSING ION PEAK AREAS IN MASS SPECTROMETRY

(71) Applicant: Thermo Fisher Scientific (Bremen) GmbH, Bremen (DE)

(72) Inventors: Bernd Hagedorn, Bremen (DE); Daniel Mourad, Bremen (DE); Toby Shanley, Bremen (DE); Hamish Stewart, Bremen (DE); Ankit Dwivedi, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 376 days.

(21) Appl. No.: 18/218,932

(22) Filed: Jul. 6, 2023

(65) Prior Publication Data

US 2024/0014021 A1 Jan. 11, 2024

(30) Foreign Application Priority Data

Jul. 8, 2022 (GB) ...................................... 2210074

(51) Int. Cl.
*H01J 49/40* (2006.01)

(52) U.S. Cl.
CPC .................................... *H01J 49/40* (2013.01)

(58) Field of Classification Search
USPC .......................................................... 250/287
See application file for complete search history.

(56) References Cited

U.S. PATENT DOCUMENTS

| | | | | |
|---|---|---|---|---|
| 6,373,052 | B1 | 4/2002 | Hoyes et al. | |
| 9,136,101 | B2 | 9/2015 | Grinfeld et al. | |
| 2013/0056627 | A1 | 3/2013 | Verenchikov | |
| 2017/0098531 | A1* | 4/2017 | Green | H01J 49/0036 |
| 2024/0371618 | A1* | 11/2024 | Mourad | H01J 49/0036 |

FOREIGN PATENT DOCUMENTS

| | | |
|---|---|---|
| EP | 3951378 | 2/2022 |
| GB | 2512695 | 1/2014 |
| GB | 2525465 | 10/2015 |

(Continued)

OTHER PUBLICATIONS

Inghram et al., "Mass Spectroscopy in Physics Research," *National Bureau of Standards Circular* 522, pp. 257-273 (Jan. 23, 1953).

(Continued)

*Primary Examiner* — Kiet T Nguyen
(74) *Attorney, Agent, or Firm* — Klarquist Sparkman, LLP

(57) ABSTRACT

A method of analysing a signal generated by a mass analyser comprises receiving a signal generated by the mass analyser, determining the area of a first ion peak of one or more ion peaks in the signal, and estimating the number of ions that contributed to the first ion peak. The number of ions that contributed to the first ion peak is estimated by determining a correction to be applied to the area of the first ion peak from a correction function, and applying the correction to the area of the first ion peak. The correction function describes a relationship between average single ion area and ion mass, mass-to-charge ratio and/or charge for the mass analyser.

21 Claims, 8 Drawing Sheets

(56) References Cited

FOREIGN PATENT DOCUMENTS

| | | |
|---|---|---|
| GB | 2580089 | 7/2020 |
| JP | 2015018786 A | 1/2015 |

OTHER PUBLICATIONS

Liu et al., "Detection of large ions in time-of-flight mass spectrometry: effects of ion mass and acceleration voltage on microchannel plate detector response," *Journal of the American Society for Mass Spectrometry* 25(8): 1374-1383 (Aug. 2014).

Moshammer et al., "Secondary Electron Emission by Low Energy Ion Impact," *Journal de Physique*, 50(2): C2-111-C2-120 (Jan. 1, 1989).

Sternglass, "Theory of Secondary Electron Emission by High-Speed Ions," *The Physical Review*, 108(1): 1-12 (Oct. 1, 1957).

Beuhler et al., "A Model of Secondary Electron Yields from Atomic and Polyatomic Ion Impacts on Copper and Tungsten Surfaces Based upon Stopping-power Calculations," *Journal of Applied Physics*, 48(9): 3928-3936 (Sep. 1, 1977).

Westmacott et al., "Secondary Ion and Electron Yield Measurements for Surfaces Bombarded with Large Molecular Ions." *Nuclear Instruments and Methods in Physics Research Section B: Beam Interactions with Materials and Atoms* 108(3):282-289 (Feb. 1, 1996).

Search Report under Section 17 for related GB Application No. 2210074.7, dated Jan. 5, 2023, 1 page.

* cited by examiner

PROCESSING ION PEAK AREAS IN MASS SPECTROMETRY

FIELD OF THE INVENTION

The present invention relates to methods of analysing ions, and in particular to mass spectrometry (MS) and mass analysers.

BACKGROUND

Time-of-flight (ToF) mass analysers utilise the property that the travelling time of an ion in an electrostatic field is proportional to the square root of the ion's mass-to-charge ratio (m/z). Ions are ejected from an ion source, accelerated to a desired energy, and impinge upon an ion detector after traveling a specified distance. The signal generated by the detector is recorded, and typically results in time-resolved peaks, with each peak being generated by one or more ions having the same mass-to-charge ratio (m/z).

With the travelling distance substantially the same for all ions, an ion's arrival time is used to determine its mass-to-charge ratio (m/z), which can later be used for identification. In addition, the area of a peak can be used to estimate the number of ions that contributed to the peak, which can in turn be used for quantification.

It is believed that there remains scope for improvements to apparatus and methods for mass analysis.

SUMMARY

A first aspect provides a method of analysing a signal generated by a mass analyser, the method comprising:

- receiving a signal generated by the mass analyser, the signal including one or more ion peaks;
- determining the area of a first ion peak of the one or more ion peaks; and
- estimating the number of ions that contributed to the first ion peak by: (i) determining a correction to be applied to the area of the first ion peak from a correction function, wherein the correction function describes a relationship between average single ion area and ion mass (m), mass to charge ratio (m/z) and/or charge (z) for the mass analyser; and (ii) applying the correction to the area of the first ion peak.

Embodiments provide methods of analysing signals generated by a mass analyser.

The mass analyser may be a time-of-flight (ToF) mass analyser. Thus, the analyser may comprise an ion detector arranged at the end of an ion path. A packet of ions may be injected into the ion path, whereupon the ions may travel along the ion path to the detector for detection. The detector may be configured to produce a signal indicative of an ion intensity received at the detector as a function of (arrival) time.

The mass analyser may instead be an ion trap mass analyser or a quadrupole mass analyser. Thus, the analyser may comprise an RF ion trap configured to release ions in order of mass to charge ratio (m/z) whereupon the ions travel to a detector for detection, or a quadrupole mass filter configured to filter ions according to their m/z wherein ions transmitted by the mass filter travel to a detector for detection. The detector may be configured to produce a signal indicative of an ion intensity received at the detector as a function of time.

In the method, one or more ion peaks are identified within the signal, and then the area of one or more or each of the identified ion peak(s) is determined, e.g. by summing or integrating the area of the signal under the peak. For one or more or each ion peak, the number of ions that arrived at the detector in order to produce that peak is then estimated based on the area of the ion peak by applying a suitable correction to the ion peak area, e.g. by dividing (or multiplying) the ion peak area by a correction factor.

In the method, the correction that is applied to a particular ion peak's area is determined from a correction function for the mass analyser. The correction function describes a relationship between average single ion areas (SIAs) and ion mass, mass to charge ratio (m/z) and/or charge for the analyser. In some embodiments, the correction function only describes the relationship between average single ion area (SIA) and ion mass or mass to charge ratio (m/z) for the analyser. In other embodiments, the correction function also (e.g. separately) describes the relationship between single ion area (SIA) and charge for the analyser. For example, the correction function may provide the approximate average area of an ion peak produced by the analyser in response to detecting a single ion as a function of the ion's mass or m/z (or equivalently as a function of the ion's velocity or arrival time) and optionally also as a function of the ion's charge.

The correction for a particular ion peak may be determined from the correction function by determining a mass or m/z (or equivalently a velocity or arrival time) associated with the ion peak and optionally a charge, and then determining the value of the correction function at the determined mass or m/z (or velocity or arrival time) and optionally charge. The so-determined value may be applied to the ion peak area (e.g. by dividing (or multiplying) the ion peak area by the value) to estimate the number of ions that contributed to the ion peak. Thus, the correction may correct for a mass and/or charge dependency of ion areas generated by the analyser.

In this regard, despite the areas of ion peaks produced by mass analysers such as ToF analysers typically having a pronounced dependence on the mass and/or charge of the ion, known mass spectrometers do not systematically correct for this mass and/or charge dependence. Moreover, there exists no known global correction function that provides suitable correction values across the entire range of masses and/or charges relevant to mass analysers such as time-of-flight mass analysers that could facilitate such correction.

As will be described in more detail below, embodiments provide a correction function which describes the relationship between average single ion area and ion mass, m/z and/or charge across the entire operational mass, m/z and/or charge range(s) of a mass analyser. This allows systematic correction of the dependence of ion area upon mass and/or charge in a particularly accurate and straightforwardly manner.

The method has particular benefits for time-of-flight mass analysers in which packets of ions are accumulated in an ion trap before being injected from the ion trap into a drift region of the analyser. In such analysers, it is often necessary to precisely control the total number of ions in each packet of ions accumulated in the ion trap, for example to optimise the number of ions to be below, but as close as possible to, a limit for the ion trap such as a space-charge limit for the ion trap. This is commonly done using so-called automatic gain control (AGC) methods, which can rely on precise measurements or estimations of the number of ions in a packet of ions to control the number of ions in a subsequent packet of ions. Each packet of ions can include ions spread over a wide range of masses and/or charge (and so with a wide range of corresponding SIAs), and so correcting for the dependence of ion area upon mass and/or charge can provide significant improvements to the accuracy of estimations of the number of ions in a packet of ions, and to AGC methods.

Embodiments also provide improved quantification of MS data, e.g. label-free quantification of ToF-MS data.

It will accordingly be appreciated that embodiments provide an improved method of analysing data generated by an ion analyser.

The mass analyser may form part of an analytical instrument such as a mass spectrometer. The instrument may comprise an ion source. Ions may be generated from a sample in the ion source. The ions may be passed from the ion source to the analyser via one or more ion optical devices arranged between the ion source and the analyser.

The one or more ion optical devices may comprise any suitable arrangement of one or more ion guides, one or more lenses, one or more gates, and the like. The one or more ion optical devices may include one or more transfer ion guides for transferring ions, and/or one or more mass selector or filters for mass selecting ions, and/or one or more ion cooling ion guides for cooling ions, and/or one or more collision or reaction cells for fragmenting or reacting ions, and so on. One or more or each ion guide may comprise an RF ion guide such as a multipole ion guide (e.g. quadrupole ion guide, hexapole ion guide, etc.), a segmented multipole ion guide, a stacked ring type ion guide, and the like.

The mass analyser can be any suitable mass analyser, such as a time-of-flight (ToF) mass analyser, an ion trap mass analyser, or a quadrupole mass analyser.

In embodiments, the mass analyser is a ToF analyser configured to determine the mass to charge ratio (m/z) of ions from their arrival times. In general, the ToF analyser may comprise an ion injector arranged at the start of an ion path, and an ion detector arranged at the end of the ion path. The analyser may be configured to analyse ions by determining arrival times of ions at the detector (i.e., the time taken for ions to travel from the injector and to arrive at the detector via the ion path).

The ion path may have any suitable form, such as being linear in the case of a linear ToF analyser, or including one or more reflections in the case of a ToF analyser comprising a reflectron or a multi-reflection time-of-flight (MR-ToF) analyser.

In particular embodiments, the analyser is a multi-reflection time-of-flight (MR-ToF) analyser, such as a titled-mirror type multi-reflection time-of-flight mass analyser, e.g. of the type described in U.S. Pat. No. 9,136,101, or a single focusing lens type multi-reflection time-of-flight mass analyser, e.g. of the type described in UK patent No. 2,580,089.

Thus, the analyser may comprise two ion mirrors spaced apart and opposing each other in a first direction X, each mirror being elongated generally along a drift direction Y between a first end and a second end, the drift direction Y being orthogonal to the first direction X. The ion injector may be located in proximity with the first end of the ion mirrors, and may be configured to inject ions into a space between the ion mirrors. The detector may be located in proximity with the first end of the ion mirrors, and may be configured to detect ions after they have completed a plurality of reflections between the ion mirrors. The analyser may be configured to analyse ions by injecting ions from the ion injector into the space between the ion mirrors, whereupon the ions may adopt a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector for detection.

The ion injector can be in any suitable form, such as for example one or more (e.g., orthogonal) acceleration electrodes. However, in particular embodiments, the ion injector comprises an ion trap. The ion trap may be configured to receive ions (from the ion source via the one or more ion optical devices), and may be configured to accumulate a packet of ions, e.g. by accumulating ions during an accumulation time period. The ion trap may be configured to inject each accumulated packet ions into the ion path (e.g. by accelerating the packet of ions along the ion path), whereupon the ions of the packet may travel along the ion path to the detector. The ion trap can have any suitable form, such as being an extraction trap, e.g. as described in UK patent No. 2,580,089.

The mass analyser may instead be an ion trap mass analyser or a quadrupole mass analyser. Thus, the analyser may comprise an RF ion trap configured to release ions in order of mass to charge ratio (m/z) whereupon the ions travel to a detector for detection, or a quadrupole mass filter configured to filter ions according to their m/z wherein ions transmitted by the mass filter travel to a detector for detection. The detector may be configured to produce a signal indicative of an ion intensity received at the detector as a function of time.

In the various embodiments, the detector can be any suitable ion detector such as one or more conversion dynodes, optionally followed by one or more electron multipliers, one or more scintillators, and/or one or more photon multipliers, and the like. The detector may be configured to detect ions received at the detector, and may be configured to produce a signal indicative of an intensity of ions received at the detector as a function of (arrival) time.

The detector can include a digitiser, such as a time-to-digital converter (TDC) or an analogue-to-digital converter (ADC), which may be configured to digitise each signal so as to produce a digitised signal. Thus, each signal that is generated by the analyser may be a digitised signal. The digitiser may have a single channel, or multiple channels e.g. where the signal from the detector is split between a first high gain channel and a second low gain channel (to increase the dynamic range).

Each signal may include one or more ion peaks, such as a plurality of ion peaks, with each peak being generated by an ion (or plural ions having substantially the same mass to charge ratio (m/z)) detected by the detector.

In some embodiments, the ToF analyser may be configured to generate a signal in respect of respective packets of ions. For example, multiple such packets of ions may be sequentially injected into the ToF ion path and detected by the detector. Thus, the method may comprise repeatedly: (i) injecting a packet of ions into the ToF ion path, (ii) detecting the packet of ions at the detector, and (iii) producing a respective signal for the packet of ions. Packets of ions may be injected into the ToF ion path (and signals may be produced) at any desired rate, such as at a rate greater than around 100 Hz and less than around 10 kHz, e.g. around 200 Hz.

Each signal that is received and processed in embodiments may be produced from a signal in respect of a single packet of ions. Alternatively, each signal that is received and processed may be produced from the signal in respect of multiple packets of ions (i.e. multiple ion injections), whereby the multiple (digitised) signals are combined (e.g. averaged).

In the method, one or more ion peaks may be identified in a signal. This may be done in any suitable manner, e.g. using any suitable peak detection algorithm. The method may proceed by determining one or more characteristics of one or more or each identified ion peak. Suitable characteristics include e.g. an ion peak's centroid and/or intensity, etc. This may be done in any suitable manner, e.g. by fitting a suitable peak model to the identified ion peak. Any suitable peak model may be used, such as for example a Gaussian or an asymmetric Gaussian.

The one or more characteristics of each ion peak can be used as desired. For example, a physicochemical property associated with each ion peak, such as its mass, charge, and/or mass to charge ratio (m/z), may be determined using the one or more characteristics. A physicochemical property associated with an ion peak may be determined using only the one or more characteristics associated with that peak, or by using both the one or more characteristics associated with that peak and the one or more characteristics associated with one or more other peaks. For example, the m/z associated with an ion peak can be determined from the arrival time (i.e. centroid) associated with that peak. The charge associated with an ion peak can be determined from prior knowledge of the sample and/or the instrument settings, or by considering related isotope patterns and/or or adjacent charge state ion peaks. The mass associated with an ion peak can be determined from the m/z and charge associated with the peak.

In the method, in addition to these characteristic(s), the area of one or more or each ion peak identified in the signal is determined. This may be done in any suitable manner, e.g. by summing or integrating the area of the signal under the peak (e.g. relative to a noise threshold) and/or by fitting a suitable ion peak model to the peak and determining the area of the ion peak model.

The so-determined ion peak area is then used to estimate the number of ions that contributed to the ion peak, i.e. to estimate how many ions impacted upon the dynode of the ion detector in order to generate the ion peak. This is done by applying a correction to the ion peak area. The correction may be applied in any suitable manner, e.g. by dividing or multiplying the ion peak area by a correction factor, or by performing any equivalent operation(s).

Where multiple different ion peaks are identified in a signal (corresponding to ions with respective different masses or m/z), the method may comprise estimating the number of ions that contributed to each of the ion peaks by applying a respective different correction to each of the ion peaks. The estimated number of ions that contributed to each ion peak in the signal can then be summed to estimate the total number of ions that contributed to the signal, e.g. to estimate the total number of ions in the packet(s) of ions that generated the signal.

In the method, the correction that is applied to the area of a particular ion peak is determined from a correction function for the analyser. The correction may be determined from the correction function by determining a mass or m/z (or equivalently a velocity or arrival time) associated with the ion peak (i.e. determining the mass or m/z of ion(s) that give rise to the ion peak), and then determining the value of the correction function at the determined mass or m/z (or velocity or arrival time). The so-determined value may be used as the correction factor, e.g. by dividing (or multiplying) the ion peak area by the correction factor.

The correction function may take any suitable form that describes (at least) the relationship between average single ion areas (SIAs) and ion mass or m/z for the analyser. As used herein, a "single ion area" or "SIA" is the area of an ion peak generated by the analyser in response to detecting a single ion. For example, the correction function can be or comprise a curve of average SIA as a function of mass or m/z (or equivalently as a function of ion velocity or arrival time). In particular embodiments, the correction function provides the (approximate) average SIA as a function of ion mass or m/z (or equivalently as a function of ion velocity or arrival time) for the analyser. Thus, the number of ions that contributed to a particular ion peak can be estimated by taking the average SIA from the correction function at the mass or m/z associated with the ion peak, and dividing the measured area of the ion peak by this value.

In embodiments, the correction function describes the relationship between average SIAs and ion mass or m/z for the analyser across a m/z range of interest for the analyser, such as across the entire operational m/z range of the analyser. As used herein the "operational m/z range" of the analyser is the range of ion m/z that the analyser is designed to analyse. In particular embodiments, the mass analyser is designed to analyse ions in life sciences applications, such as for example small and large organic molecules, biomolecules, DNA, RNA, proteins, peptides, fragments thereof, and the like. Thus, the correction function may describe the relationship between average SIA and ion m/z across a m/z range from about 25, 50, 75 or 100, to about 6000, 8000, 10,000, 15,000 or more. In some embodiments, the correction function describes the relationship between average SIA and ion m/z (at least) across a m/z range from about 50 to about 8000.

The correction function may be a function that is continuous over most or all of this m/z range, and the correction function may vary continuously over most or all of this m/z range. This allows systematic correction of the dependence of ion area upon mass or m/z in a particularly accurate and straightforwardly manner.

The correction function may have any suitable form, and may be derived in any suitable manner. For example, the correction function may be derived based on "first principle" theoretical analyses of the interaction(s) of ions with the detector. However, the inventors have realised that, due to the large mass and/or charge parameter space and the inherent complexity of the molecular ions typically analysed in life science MS applications (e.g. including a large variety of different conformational structures), such first principle analyses are not well suited to the present context.

Thus, in particular embodiments, the correction function is derived by fitting (parameters of) a model to experimentally acquired SIA data for the analyser. The experimentally acquired SIA data may comprise experimental measurements of SIA for an analyser for ions across most or all of the mass, m/z and/or charge range(s) of interest. The SIA data may comprise experimental measurements of SIA for ions of the same (e.g. single) charge. The SIA data may include plural measurements of SIA at each of plural different masses or m/z.

The SIA data to which the model is fitted can be acquired in any suitable manner. For example, it would be possible to acquire SIA data in respect of each and every individual analyser, and to derive the correction function for each respective analyser by fitting (parameters of) a model to the SIA data for that analyser. However, in particular embodiments, SIA data is acquired in respect of only one (or a few) particular representative analyser(s) of a class of analyser, and a global correction function is derived by fitting (parameters of) a model to that data. The global correction function may then be used as or to derive the correction function for one or more different analysers of the same class (as is described further below).

The SIA data to which the model is fitted can be raw SIA data recorded for the (representative) analyser(s). Alternatively, the raw SIA data can be suitably processed and/or corrected before the model is fit to the processed and/or corrected data.

In embodiments, the data is firstly cleaned, e.g. to remove noise and/or effects like peak ringing, etc. This may be done by clipping the raw SIA data points for a given mass using lower and/or upper thresholds. In these embodiments, the lower and/or upper thresholds may be determined in any suitable manner. For example, the lower threshold may be a fixed threshold, and the upper threshold may be dynamically calculated, e.g. by rejecting data points that exceed a specified number of standard deviations from the median. Other data cleaning procedures would be possible.

In embodiments, the mean of the (remaining) SIA values for each given mass is determined, and the model is fit to these mean SIA values. The mean SIA values may be corrected to account for the data that has been removed by the cleaning step, e.g. by fitting the expected distribution to the cleaned data and taking the mean of the fitted distribution rather than the mean of the cleaned data.

In further embodiments, the SIA data may be corrected for detection efficiency before the model is fit to the corrected data. As described above, the detector may comprise a conversion dynode followed by one or more stages of electron multiplication. The conversion dynode may be configured to produce one or more secondary electrons when an ion impacts upon the conversion dynode. However, it has been recognised that there is a non-zero probability of zero secondary electrons being created by the conversion dynode when an ion impacts upon the conversion dynode. Such zero secondary electron events do not produce any measurable signal, and so the mean SIA values of the experimentally measured SIA data are likely to be overestimates of the actual mean SIA. Furthermore, the likelihood of zero secondary electron events is higher for masses that provide lower SIAs, because ions at these masses are less efficiently converted into electrons (i.e. produce fewer secondary electrons per ion).

Thus, in embodiments, the SIA data (or the mean SIA values) is corrected to take account of the possibility of zero secondary electron events, and the model is fit to the mean of the corrected SIA values (or to the corrected mean SIA values). It has been found that by taking zero secondary electron events into account, the accuracy of the correction function can be significantly improved.

The correction to the SIA data may be done in any suitable manner and may take any suitable form. In embodiments, the magnitude of the correction applied to a particular SIA value (or to a particular mean SIA value) at a particular mass depends on the mean SIA value at the particular mass, e.g. so as to take account of the variation in the probability of zero secondary electron events as a function of mean SIA. As is described further below, the correction may be obtained by assuming that the probability distribution of the ion to electron conversion process is Poisson-like, and by using an estimation of the secondary electron yield (SEY) (i.e. the mean number of secondary electrons produced by the dynode in response to an ion impacting the dynode) at a particular mass. The estimation of the SEY at a particular mass may in turn be obtained by comparing experimentally acquired SIA data to Monte Carlo simulations.

The model that is fit to the (optionally processed and/or corrected) experimental data can take any suitable form. In particular, the model may be a semi-empirically derived model. In this regard, as is described in more detail below, theoretical considerations suggest in general that the SIA's mass dependence has a maximum at a transition mass that depends upon properties of the dynode, that the SIA increases with increasing mass at masses below the transition mass, and that the SIA decreases with increasing mass at masses above the transition mass. In accordance with embodiments, a model that takes these (and other) theoretical considerations into account has been created, but which is otherwise empirically derived. Thus, in embodiments, the mass dependence of the model (and the correction function) has a maximum at a transition mass, increases with increasing mass at masses below the transition mass, and decreases with increasing mass at masses above the transition mass.

The transition mass may take a suitable value that depends on the properties of the dynode, e.g. that depends on the material from which the dynode is formed, etc. Suitable transition masses are in the range 100-200 Da. For example, where the dynode is a stainless-steel dynode, the transition mass may have a value around 140 Da.

The inventors have found that a particularly suitable model (and so correction function) has a form $SIA \propto (\sqrt{2T})^b a m^{-b/2} \exp(-(2T)^{1/2} m^{-1/2}/v_0)$, or equivalently $SIA \propto a v^b \exp(-v/v_0)$, where T is the kinetic energy of an ion (which is fixed by the acceleration voltage applied to the ion by the ion injector), m is its mass, v is its velocity, and a, b and $v_0$ are best fit parameters. In embodiments, the mass dependence of the (global) correction function is derived by fitting the parameters (i.e. a, b and $v_0$) of this model to the (optionally processed and/or corrected) experimentally acquired SIA data for the (representative) analyser. Any suitable fitting technique can be used, such as nonlinear regression, least squares fitting, etc. The dominating error is on the dependent variable (mean SIAs), while the independent variable (mass) is known to high accuracy.

The inventors have found that this model is particularly suited to the present embodiments, in particular where it is desired to establish a global correction function that can be used across multiple different instruments of the same class, and that can be used in the context of an analyser that is used to analyse a wide range of different analytes. The global correction function may be defined for multiple analysers that have at least the same instrument geometry, use the same dynode material(s), and are configured such that ions arrive at the detector with the same incident angle, etc. In this regard, the inventors have recognised that the global correction function of various embodiments can be calibrated to each individual analyser in a particular straightforward manner, e.g. by simple scaling. Furthermore, the use of this relatively simple power law model prevents overfitting to the experimental data, which allows the subsequently obtained curve to be used for multiple different instruments of the same class, and for a suitably wide range of different analytes.

As mentioned above, the global correction function can be used as the correction function for one or more different analysers of the same class (i.e. that have at least the same instrument geometry, use the same dynode material(s), and are configured such that ions arrive at the detector with the same incident angle, etc.). In particular embodiments, the global correction function is used to derive the correction function for each different analyser of the same class. Other classes of analysers or similar analysers that use other materials, e.g. for the dynode(s) etc., may need a recalibration of all free parameters of the correction function. In particular embodiments, the correction function for a particular analyser is derived by calibrating, e.g. vertically scaling (i.e. scaling the SIA axis of), the global correction function to the particular analyser. The calibration may comprise determining a mean SIA value for the analyser at a particular mass or m/z, e.g. where the particular mass or m/z is at or close to the transition mass. Then, the correction function for the analyser may be derived by scaling the (SIA axis of the) global correction function according to the mean SIA value. This may comprise scaling the SIA axis of the global correction function such that the value of the scaled correction function at the particular mass or m/z is equal to the determined mean SIA value for the analyser at the particular mass or m/z.

In embodiments, each individual analyser may also be calibrated in respect of an operational range of detector voltages (i.e. a range of voltages that may be applied across the detector's electron multiplication stage(s), so as to provide different levels of amplification). This calibration may be used to derive an SIA versus detector voltage calibration curve for each individual analyser, and may be repeated, e.g. periodically, to take account of detector aging. This calibration function may be combined with the correction function derived from the global correction function described above, i.e. thereby assuming that the ion-to-electron conversion efficiency is the same for all analysers of the same class. Thus, the above calibration describes the mass or m/z dependent ion-to-electron calibration, while the second calibration describes the detector voltage dependent electron multiplication (or possibly electron-to-photon conversion followed by a PMT). As the ion-to-electron conversion and the electron-multiplication are largely independent processes, these two calibrations can be combined to model the overall detector signal created by a single ion.

It would be possible for the correction function to describe SIA as a function of mass or m/z only, e.g. where the analyser is to be used to analyse only ions of the same charge. However, in further embodiments, the correction function also describes a relationship between average single ion areas and charge for the analyser. For example, the correction function can be a surface describing average SIA as a function of mass or m/z (or equivalently as a function of ion velocity or arrival time) and charge. In particular embodiments, the correction function provides the (approximate) average SIA as a function of ion mass or m/z (or equivalently as a function of ion velocity or arrival time) and charge for the analyser. Thus, the number of ions that contributed to a particular ion peak can be estimated by taking the average SIA from the correction function at the mass or m/z and charge associated with the ion peak, and dividing the measured area of the ion peak by this value.

In embodiments, the correction function describes the relationship between average SIA and charge for the analyser across a charge range of interest for the analyser, such as from about 1 elementary charge, to about 10 elementary charges, 15 elementary charges, 20 elementary charges, or more. In particular embodiments, the correction function describes the relationship between average SIA and ion charge across a range from about 1 to about 15 elementary charges.

In these embodiments, the relationship between average single ion areas and charge may again be derived by fitting (parameters of) a model to experimentally acquired SIA data for the analyser. The experimentally acquired SIA data may comprise experimental measurements of SIA for the analyser for ions across most or all of the charge range of interest.

In particular embodiments, the model (and the correction function) simply increases linearly with charge.

Various embodiments also extend to the generation of the correction function.

Thus, a further aspect provides a method of determining a correction function for a mass analyser, the method comprising:

using a mass analyser to analyse a plurality of single ions, wherein the plurality of single ions includes ions having masses, m/z and or charge spread across most or all of mass, m/z and/or charge range(s) of interest for the analyser;

generating single ion area (SIA) data by determining the area of each ion peak of a plurality of ion peaks generated by the analyser in response to detecting the plurality of single ions; and deriving a correction function by fitting a model to the SIA data.

This aspect can, and in embodiments does, include any one or more or each of the optional features described herein.

Thus, for example, the SIA data may be processed, corrected and/or mean SIA data, e.g. as described above. The mass or m/z dependence of the model (and the correction function) may have the form described above, e.g. $SIA \propto (\sqrt{2T})^b a m^{-b/2} \exp(-(2T)^{1/2} m^{-1/2}/v_0)$, or equivalently $SIA \propto a v^b \exp(-v/v_0)$. The model (and the correction function) may also describe a relationship between average single ion area and charge for the analyser, e.g. as described above.

The SIA data may be SIA data for a representative analyser, the correction function may be a global correction function, and a correction function for another analyser of the same class may be derived from the global correction function by scaling the global correction function, e.g. as described above. The correction function may be used to estimate the number of ions that contributed to ion peaks produced by the analyser, e.g. as described above.

A further aspect provides a method of operating an analytical instrument, such as a mass spectrometer, that comprises an ion source and a mass analyser, the method comprising:

generating ions in the ion source;

analysing the ions with the mass analyser so as to generate a signal; and analysing the signal using the method(s) described above.

This aspect can, and in embodiments does, include any one or more or each of the optional features described herein.

Thus, for example, the analyser may be a ToF analyser including an ion trap arranged at the start of an ion path, and an ion detector arranged at the end of the ion path. The ion trap may be configured to receive ions, and to accumulate a packet of ions. The ion trap may be configured to inject each accumulated packet ions into the ion path, whereupon the ions of the packet may travel along the ion path to the detector.

The method may comprise estimating the total number of ions in a packet of ions that generated the signal. The estimated total number of ions may then be used to control the number of ions in a packet of ions subsequently accumulated in the ion trap. The number of ions in the packet of ions subsequently accumulated in the ion trap may be controlled by controlling an accumulation time (e.g. fill time) of ions into the ion trap (i.e. in an automatic gain control (AGC) method). Thus, the method may comprise using the estimated total number of ions of a first packet of ions to control the accumulation time (e.g. fill time) of ions into the ion trap for a subsequent packet of ions. In general, a fill time may be determined based on: the estimated total number of ions in one or more previous packets of ions, the known fill time of the one or more previous packets of ions into the ion trap, and a desired or target maximum number of ions in the ion trap.

A further aspect provides a non-transitory computer readable storage medium storing computer software code which when executed on a processor performs the method(s) described above.

A further aspect provides a control system for an analytical instrument, such as a mass spectrometer, the control system configured to cause the analytical instrument to perform the method(s) described above.

A further aspect provides an analytical instrument, such as a mass spectrometer, comprising an ion analyser and the control system described above.

A further aspect provides an analytical instrument comprising:

a mass analyser; and a control system configured to:

receive a signal generated by the mass analyser, the signal including one or more ion peaks;

determine the area of a first ion peak of the one or more ion peaks; and estimate the number of ions that contributed to the first ion peak by: (i) determining a correction to be applied to the area of the first ion peak from a correction function, wherein the correction function describes a relationship between average single ion area and ion mass, m/z and/or charge for the mass analyser; and (ii) applying the correction to the area of the first ion peak.

These aspects and embodiments can, and in embodiments do, include any one or more or each of the optional features described herein.

Thus, for example, the analytical instrument may be a mass spectrometer, and the mass analyser may be a time-of-flight (ToF) mass analyser such as a multi-reflection time-of-flight (MR-ToF) analyser. The time-of-flight (ToF) mass analyser may comprise an ion trap configured to inject ions into a drift region of the analyser. The control system may be configured to cause the instrument to perform any one or more or each of the method(s) described above.

DESCRIPTION OF THE DRAWINGS

Various embodiments will now be described in more detail with reference to the accompanying Figures, in which.

DETAILED DESCRIPTION

Figure 1:
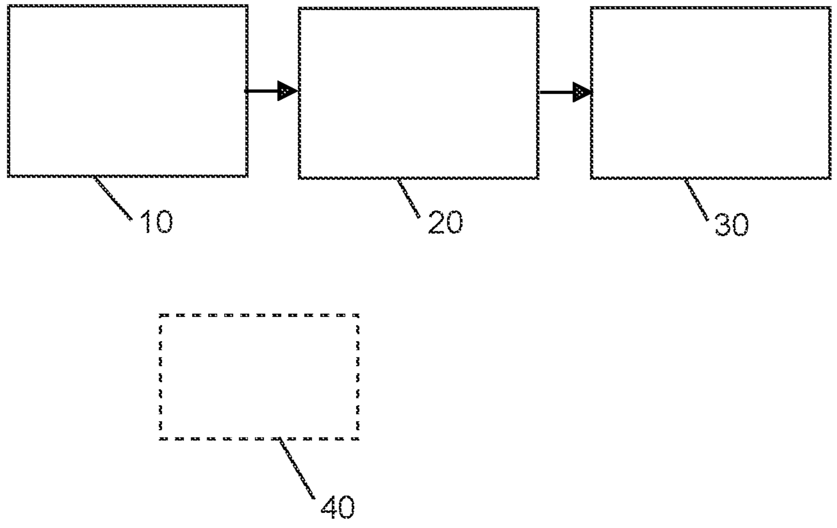
FIG. 1 shows schematically an analytical instrument in accordance with embodiments.

FIG. 1 illustrates schematically an analytical instrument, such as a mass spectrometer, that may be operated in accordance with embodiments. As shown in FIG. 1, the analytical instrument includes an ion source 10, one or more ion transfer stages 20, and an analyser 30.

The ion source 10 is configured to generate ions from a sample. The ion source 10 can be any suitable continuous or pulsed ion source, such as an electrospray ionisation (ESI) ion source, a MALDI ion source, an atmospheric pressure ionisation (API) ion source, a plasma ion source, an electron ionisation ion source, a chemical ionisation ion source, and so on. In some embodiments, more than one ion source may be provided and used. The ions may be any suitable type of ions to be analysed, e.g. small and large organic molecules, biomolecules, DNA, RNA, proteins, peptides, fragments thereof, and the like.

The ion source 10 may optionally be coupled to a separation device such as a liquid chromatography separation device or a capillary electrophoresis separation device (not shown), such that the sample which is ionised in the ion source 10 comes from the separation device.

The ion transfer stage(s) 20 are arranged downstream of the ion source 10 and may include an atmospheric pressure interface and one or more ion guides, lenses and/or other ion optical devices configured such that some or most of the ions generated by the ion source 10 can be transferred from the ion source 10 to the analyser 30. The ion transfer stage(s) 20 may include any suitable number and configuration of ion optical devices, for example optionally including any one or more of: one or more RF and/or multipole ion guides, one or more ion guides for cooling ions, one or more mass selective ion guides, and so on.

The analyser 30 is arranged downstream of the ion transfer stage(s) 20 and is configured to receive ions from the ion transfer stage(s) 20. The analyser is configured to analyse the ions so as to determine a physicochemical property of the ions, such as their mass or mass to charge ratio. To do this, the analyser 30 is configured to pass ions to a detector. The instrument may be configured to determine the physicochemical property of the ions from a signal measured by the detector. The instrument may be configured produce a spectrum of the analysed ions, such as a mass spectrum.

The analyser 30 can be any suitable mass analyser, such as a time-of-flight (ToF) mass analyser, an ion trap mass analyser, or a quadrupole mass analyser.

In particular embodiments, the analyser 30 is a time-of-flight (ToF) mass analyser, e.g. configured to determine the mass to charge ratio (m/z) of ions by passing the ions along an ion path within a drift region of the analyser, where the drift region is maintained at high vacuum (e.g. $<1\times10^{-5}$ mbar). Ions may be accelerated into the drift region by an electric field, and may be detected by an ion detector arranged at the end of the ion path. The acceleration may cause ions having a relatively low mass to charge ratio to achieve a relatively high velocity and reach the ion detector prior to ions having a relatively high mass to charge ratio. Thus, ions arrive at the ion detector after a time determined by their velocity and the length of the ion path, which enables the mass to charge ratio of the ions to be determined. Each ion or group of ions arriving at the detector may be sampled by the detector, and the signal from the detector may be digitised. A processor may then determine a value indicative of the time of flight and/or mass-to-charge ratio ("m/z") of the ion or group of ions. Data for multiple ions may be collected and combined to generate a time of flight ("ToF") spectrum and/or a mass spectrum.

It should be noted that FIG. 1 is merely schematic, and that the analytical instrument can, and in embodiments does, include any number of one or more additional components. For example, in some embodiments, the analytical instrument includes a collision or reaction cell for fragmenting or reacting ions, and the ions analysed by the analyser 30 can be fragment or product ions produced by fragmenting or reacting parent ions generated by the ion source 10.

As also shown in FIG. 1, the instrument is under the control of a control unit 40, such as an appropriately programmed computer, which controls the operation of various components of the instrument including the analyser 30. The control unit 40 may also receive and process data from various components including the detector(s) in accordance with embodiments described herein.

Figure 2:
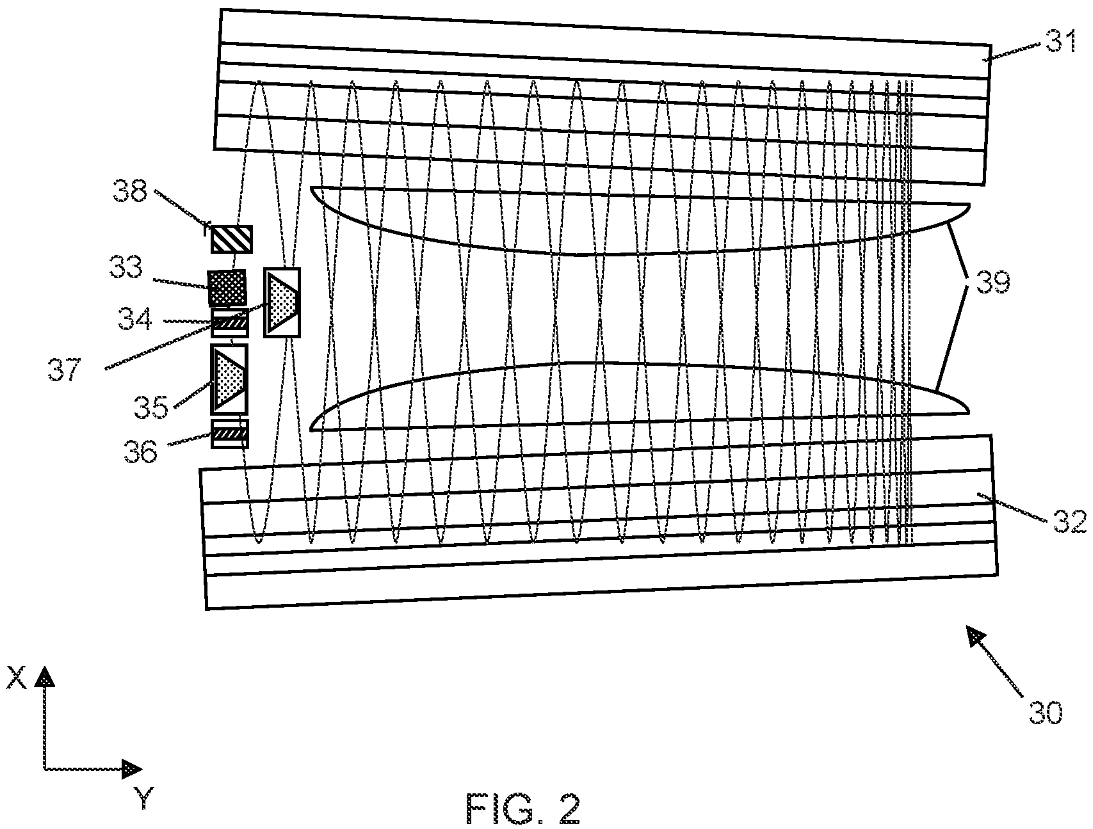
FIG. 2 shows schematically a multi-reflection time-of-flight mass analyser in accordance with embodiments.

FIG. 2 illustrates schematically detail of one exemplary embodiment of the analyser 30. In this embodiment, the analyser 30 is a multi-reflecting time-of-flight (MR-ToF) mass analyser.

As shown in FIG. 2, the multi-reflection time-of-flight analyser 30 includes a pair of ion mirrors 31, 32 that are spaced apart and face each other in a first direction X. The ion mirrors 31, 32 are elongated along an orthogonal drift direction Y between a first end and a second end.

An ion source (injector) 33, which may be in the form of an ion trap, is arranged at one end (the first end) of the analyser. The ion source 33 may be arranged and configured to receive ions from the ion transfer stage(s) 20. Ions may be accumulated in the ion source 33, before being injected into the space between the ion mirrors 31, 32. As shown in FIG. 2, ions may be injected from the ion source 33 with a relatively small injection angle or drift direction velocity, creating a zig-zag ion trajectory, whereby different oscillations between the mirrors 31, 32 are separate in space.

One or more lenses and/or deflectors may be arranged along the ion path, between the ion source 33 and the ion mirror 32 first encountered by the ions. For example, as shown in FIG. 2, a first out-of-plane lens 34, an injection deflector 35, and a second out-of-plane lens 36 may be arranged along the ion path, between the ion source 33 and the ion mirror 32 first encountered by the ions. Other arrangements would be possible. In general, the one or more lenses and/or deflectors may be configured to suitably condition, focus and/or deflect the ion beam, i.e. such that it is caused to adopt the desired trajectory through the analyser.

The analyser also includes another deflector 37, which is arranged along the ion path, between the ion mirrors 31, 32. As shown in FIG. 2, the deflector 37 may be arranged approximately equidistant between the ion mirrors 31, 32, along the ion path after its first ion mirror reflection (in ion mirror 32), and before its second ion mirror reflection (in the other ion mirror 31).

The analyser also includes a detector 38. The detector 38 can be any suitable ion detector configured to detect ions, and e.g. to record an intensity and time of arrival associated with the arrival of ion(s) at the detector. Suitable detectors include, for example, one or more conversion dynodes, optionally followed by one or more electron multipliers, and the like.

To analyse ions, ions may be injected from the ion source 33 into the space between the ion mirrors 31, 32, in such a way that the ions adopt a zigzag ion path having plural reflections between the ion mirrors 31, 32 in the X direction, whilst: (a) drifting along the drift direction Y towards the opposite (second) end of the ion mirrors 31, 32, (b) reversing drift direction velocity in proximity with the second end of the ion mirrors 31, 32, and then (c) drifting back along the drift direction Y to the deflector 37. The ions can then be caused to travel from the deflector 37 to the detector 38 for detection.

In the analyser of FIG. 2, the ions mirrors 31, 32 are both tilted with respect to the X and/or drift Y direction. It would instead be possible for only one of the ion mirrors 31, 32 to be tilted, and e.g. for the other one of the ion mirrors 31, 32 to be arranged parallel to the drift Y direction. In general, the ion mirrors are a non-constant distance from each other in the X direction along their lengths in the drift direction Y. The drift direction velocity of ions towards the second end of the ion mirrors is opposed by an electric field resulting from the non-constant distance of the two mirrors from each other, and this electric field causes the ions to reverse their drift direction velocity in proximity with the second end of the ion mirrors and drift back along the drift direction towards the deflector 37.

The analyser depicted in FIG. 2, further comprises a pair of correcting stripe electrodes 39. Ions travelling down the drift length are slightly deflected with each pass through the mirrors 31, 32 and the additional stripe electrodes 39 are used to correct for the time-of-flight error created by the varying distance between the mirrors. For example, the stripe electrodes 39 may be electrically biased such that the period of ion oscillation between the mirrors is substantially constant along the whole of the drift length (despite the non-constant distance between the two mirrors from). The ions eventually find themselves reflected back down the drift space and focused at the detector 38.

Further detail of the tilted-mirror type multireflection time-of-flight mass analyser of FIG. 2 is given in U.S. Pat. No. 9,136,101.

It should be noted that in general the analyser 30 can be any suitable type of mass analyser or time-of-flight (ToF) mass analyser. For example, the analyser may be a single-lens type multireflection time-of-flight mass analyser, e.g. as described in UK Patent No. GB 2,580,089.

In general, time-of-flight (ToF) mass analysers with ion-impact detectors utilise the property that the travelling time of an ion in an electrostatic field is proportional to the square root of the ion's mass to charge ratio (m/z). Ions are ejected simultaneously from an ion source (e.g., an orthogonal accelerator or a radio-frequency ion trap), accelerated to a desirable energy, and impinge upon an ion detector after traveling a specified distance. Equally, in ion trap mass analysers and quadrupole mass analysers, ions eventually impinge upon an ion detector.

Figure 3:
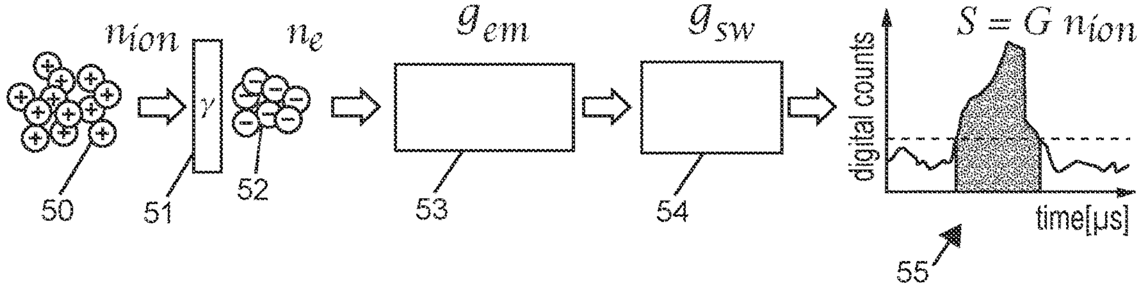
FIG. 3 illustrates schematically a process of detecting ions in an ion analyser in accordance with embodiments.

FIG. 3 illustrates schematically the process of a packet of $n_{ion}$ ions 50 being detected by the detector 38. In particular, FIG. 3 depicts the ion-to-electron conversion process and subsequent signal processing chain.

As shown in FIG. 3, the detector 38 comprises a conversion dynode 51 followed by one or more electron multiplier stages 53. A packet of $n_{ion}$ ions 50 is caused to impact upon the conversion dynode 51, whereupon $n_e$ secondary electrons 52 are produced. The packet of $n_{ion}$ ions is converted to $n_e$ secondary electrons with a conversion factor $\gamma$.

The secondary electrons 52 are then amplified by the one or more stages of electron multiplication 53, so as to produce a signal indicative of the intensity of the ions 50 received at the conversion dynode 51 as a function of time. The one or more stages of electron multiplication 53 provide a signal increase with gain factor $g_{em}$.

The generated signal is recorded by data acquisition electronics 54 such as a digitiser, e.g. either a time-to-digital converter (TDC) or an analogue-to-digital converter (ADC). The analogue-to-digital conversion stage 54 introduces another gain factor $g_{sw}$.

In the embodiment depicted in FIG. 3, the detector 38 comprises a conversion dynode 51 followed by one or more electron multiplier stages 53. However, it should be noted that in general, the detector 38 may include one or more intermediate conversion processes additional to those shown in FIG. 3, such as for example, one or more scintillator crystals, photomultiplier tubes (PMT), etc.

As shown in FIG. 3, the detection process results in time resolved peaks 55, where each peak is generated by ions of substantially the same mass-to-charge ratio. For ToF analysers, as the travelling distance is substantially the same for all of the ions 50, the ion arrival time can be used to determine the mass-to-charge ratio (m/z) of the ions, which can then be used for ion identification.

Moreover, the area S of a time-resolved peak can be used to determine the number of ions that contributed to the peak, which can then be used for quantification. The final signal S is obtained by peak-wise integration of the digitized signal counts over the arrival time axis, and is designated herein as "ion area", "ion peak area" (shaded region in FIG. 3) or, specifically, "single ion area" (SIA) in the limit $n_{ion}=1$.

It has been recognised that the effective gain factor G between the integrated digitised signal S and the initial number of incident ions $n_{ion}$ (i.e. where $S=Gn_{ion}$) is not constant, but bears a pronounced dependence on the statistical properties of the incident ions, the different conversion and amplification stages, as well as on the mass and charge state of the ions.

Figure 4A:
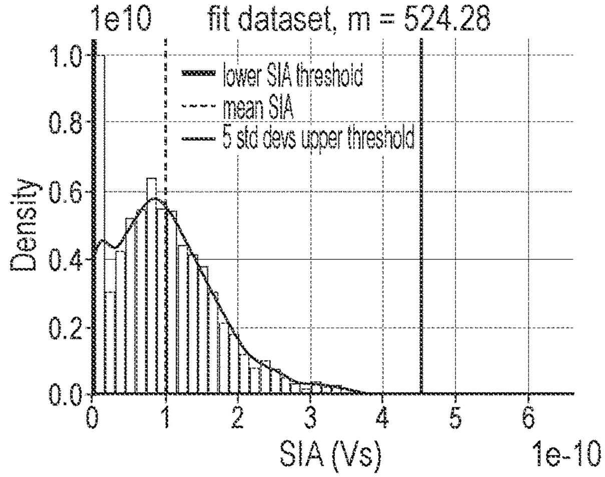
FIG. 4A shows a histogram including kernel density estimation of recorded SIAs for a selected species.
Figure 4B:
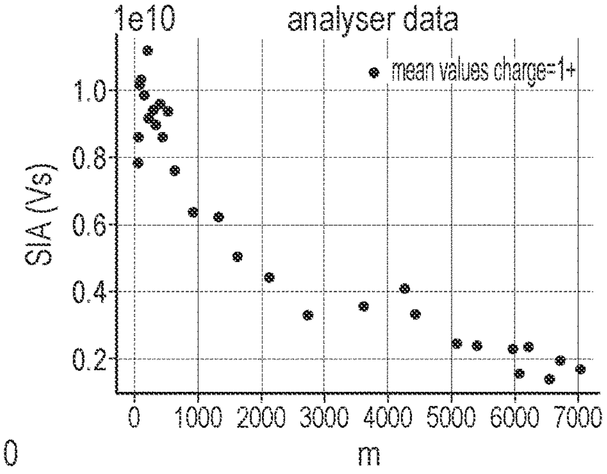
FIG. 4B shows the mean values of the corresponding SIA distributions.

FIG. 4A shows a histogram including a kernel density estimation of recorded SIAs for a selected species (a singly charged MRFA peptide) using an analyser of the type depicted in FIG. 2. To clean the raw input data, a lower SIA threshold (around the estimated noise level) and a self-consistently determined upper SIA threshold was applied. FIG. 4B shows a distribution of the mean values of the corresponding SIAs, which shows a pronounced mass dependency for singly charged ions. A more sophisticated data analysis and cleaning procedure (not shown) suggests a unimodal shape of the SIA over mass curve with a maximum around a transition mass of of $m_{tr}\approx 150$ Da.

In the following literature sources, the secondary electron yield (SEY) upon ion bombardment of (metallic or semi-conducting) conversion dynodes as a function of mass is either derived from first principles or is determined semi-heuristically for a narrow range of masses and incident ion species: (i) Beuhler, R. J., and L. Friedman. "A Model of Secondary Electron Yields from Atomic and Polyatomic Ion Impacts on Copper and Tungsten Surfaces Based upon Stopping-power Calculations." Journal of Applied Physics 48, no. 9 (Sep. 1, 1977): 3928-36; (ii) Liu, Ranran, Qiyao Li, and Lloyd M. Smith. "Detection of Large Ions in Time-of-Flight Mass Spectrometry: Effects of Ion Mass and Acceleration Voltage on Microchannel Plate Detector Response." Journal of the American Society for Mass Spectrometry 25, no. 8 (August 2014): 1374-83; (iii) Moshammer, R., and R. Matthäus. "Secondary Electron Emission by Low Energy Ion Impact." Journal de Physique Colloques 50, no. C2 (1989): C2-111-C2-120; (iv) Sternglass, E. J. "Theory of Secondary Electron Emission by High-Speed Ions." Physical Review 108, no. 1 (Oct. 1, 1957): 1-12; (v) Westmacott, G., W. Ens, and K. G. Standing. "Secondary Ion and Electron Yield Measurements for Surfaces Bombarded with Large Molecular Ions." Nuclear Instruments and Methods in Physics Research Section B: Beam Interactions with Materials and Atoms 108, no. 3 (Feb. 1, 1996): 282-89.

These estimations are typically based on the pioneering work of Bloch, Bethe and Bohr on the stopping power of materials on charged particles, which models the mean energy loss per penetration distance, $$-\left(\frac{dE}{dx}\right),$$

and typically incorporate corrections for very small incident energies (where ions can still carry atomic electrons, effectively reducing the net charge) or the opposite high-energy case. The basic properties of the so-derived energy loss curves can be used to understand the signature behaviour shown in FIG. 4B, like the presence of a local maximum in the SIA characteristic: similar looking curves can be obtained by considering the possible energy transfer $$\left(\frac{dE}{dx}\right)$$

to the excitation of secondary electrons, as well as the characteristic diffusion length of secondary electrons that are excited in the bulk and have to reach the surface with sufficient remaining escape velocity.

These various works each refer to very different mass ranges, starting from elementary particles with atomic numbers up to $Z\approx 100$, and going up to the detection of large molecular ions ($m\approx 1000$-100 000 Da). Also, a linear velocity dependence of the SEY has been assumed and used for a long time in the art to describe the SEY for masses greater than a transition mass ($m>m_{tr}$) (see, e.g., Inghram, Hayden and Hess, "Mass Spectroscopy in Physics Research", National Bureau of Standards (US), Circ., 522, 1953, p. 257).

Despite literature and experimental evidence showing that the SEY for ToF analysers has a pronounced dependence on ion mass and charge, known mass spectrometers do not systematically correct for the mass and/or charge dependence of the ion-electron conversion process. This in effect corresponds to the approximation of the data points in FIG. 4B by a constant horizontal line.

Furthermore, there exist no successful attempts to find a global SEY (m, z) curve that best fits the experimental data over the whole range of mass-to-charge ratios (e.g. from m/z≈50-15,000 or more) relevant for ToF-MS analytical instruments, such as the MR-ToF instrument of the type depicted in FIG. 2, e.g. which uses an acceleration voltage of 10 kV.

In addition, it can be understood from the statistical properties of the conversion process and the subsequent detection toolchain, that in known analytical instruments, measured SIAs do not include true negative and/or zero secondary electron events that will occur in practice with non-vanishing probability. A corresponding correction based on a scaling with a detection efficiency ≤1 is not performed in known analytical instruments.

Thus, embodiments provide a correction function that can be used to correct for these mass and charge dependencies, and detection efficiencies. In particular, embodiments provide a correction function which describes the relationship between SIAs, ion mass and charge across the entire operational parameter space of a mass analyser. This allows systematic correction of the dependence of ion area upon mass and/or charge in a particularly accurate and straightforwardly manner.

In order to provide an accurate estimation of the number of incident ions from measured peak areas (e.g. for quantification), a number of individual but connected problems are addressed by embodiments. Firstly, a model for the SEYs or, equivalently, SIAs as a function of mass (or, equivalently, velocity) and charge is provided. Secondly, the measured SIAs are corrected for zero-electron events by estimating the detection efficiency. This may be obtained by exploiting known statistical properties of the conversion process, but requires an initial estimate of the SEY itself as input. An estimate for the initial ion to (secondary) electron conversion is therefore provided. By addressing these individual problems, embodiments facilitate accurate estimations of the total number of incident ions from measured ion peak areas.

In this regard, the inventors have recognised that the large mass and charge parameter space, and the inherent complexity (e.g. including their different conformational structures) of the molecular ions usually analysed using ToF analysers and other analysers in the area of the life sciences, makes it very unlikely that an analysis based on first principles is feasible for the problem at hand. Thus, embodiments provide a correction function that has been derived by fitting a semi-empirical globally valid model to the mass of experimentally acquired SIA data for a ToF-MS (or other MS) instrument.

In general embodiments involve: (i) fitting a semi-empirical globally valid model to the mass/velocity and charge dependence of SIAs and SEYs based on experimental data for a mass analyser; (ii) estimating the SEYs by fitting measured, sufficiently corrected and algorithmically cleaned SIA data to the model-based predictions from a Monte Carlo (MC) simulation; (iii) using the estimated SEYs to correct the initially obtained SIA data by a detection efficiency coefficient that is obtained based on statistical properties of the electron multiplication process; and (iv) thereby facilitating accurate predictions of the number of incident ions, e.g. for label-free quantification of ToF-MS data.

Thus, embodiments provide improved quantification of the incident ion abundance for mass spectrometry, particularly time-of-flight mass spectrometry (ToF-MS), based on improved (heuristic and statistical) models for the mass and charge dependency of the ion to electron conversion process and subsequent secondary electron yield of the detection toolchain.

The following description provides a representative example of a workflow based on raw SIA data to illustrate embodiments and the algorithmic steps used therein. For reasons of clarity, mass dependent corrections for singly charged ions and charge dependent additional corrections are presented separately. As used herein, all referenced masses m (implying charge number z=1 when used in context of mass spectra without mentioning charge state) are to be understood as being provided in units of Daltons (Da), unless otherwise stated, and the dimensionless m/z is the quotient of mass in units of Daltons and the charge number.

1. Mass Dependent Corrections for Singly Charged Species

Firstly, for given acceleration and detector voltages, SIA data is recorded over a satisfactorily large mass range for singly charged species.

Figure 5:
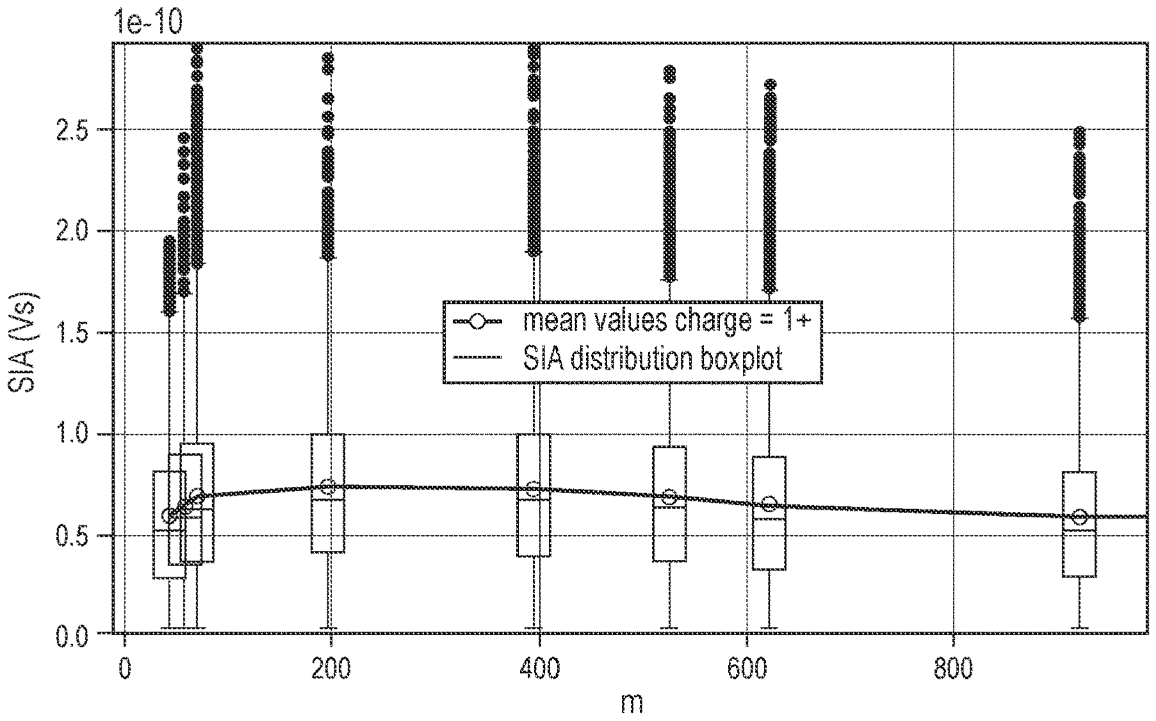
FIG. 5 shows a box and whisker plot of raw SIA data together with the mean values of the cleaned data.

FIG. 5 shows an excerpt of a box and whisker plot of raw SIA data for an MR-ToF instrument of the type depicted in FIG. 2, together with the mean values of the cleaned data, referencing the very same data set as depicted in FIG. 4. Although the data depicted in FIG. 5 covers a mass range m/z≈50-8,000, SIA data across any desired mass range could be acquired in the same way. Charge dependent data may also be acquired, e.g. for a selected set of ion masses (as described in section 2, below).

In MR-ToF instruments of the type depicted in FIG. 2, a small shift in the voltages provided to the ion mirrors 31, 32, e.g. <5%, is sufficient to completely time-defocus ion packets at the detector 38 into single ions. For example, ions with a m/z of 500, which would otherwise be focused to a <4 ns peak might become spread over a microsecond or so. Thereby, the signal may be split up into about many hundreds of individual peaks, each having a width of about 1 ns. The raw data shown in FIG. 5 was acquired using this technique, which allows single ion data to be acquired in a relatively quick and straightforward manner, e.g. without having to attenuate the ion beam. This technique is also compatible with other types of ToF analyser, e.g. simpler single-reflection ToF analysers, but the level of defocusing would have to be greater, or the number of ions lower.

1.1 Obtain Initial Mass Dependent SIA Best Fit Curve

Due to the large variability of the input data, and also to take into account the noise threshold and further effects like peak-ringing and similar, the set of raw SIA data points for a given mass are firstly clipped by using a fixed lower threshold and a dynamically calculated upper threshold obtained from iterative sigma clipping around the data median (successively rejecting values that exceed a specified number of standard deviations from the median).

Then, the mean values of the remaining SIAs are used for a given mass, assuming (for simplicity) the cleaned distribution to be of a shape that can be satisfactorily approximated by a Poisson distribution. This approximation is motivated by the nature of the dominating underlying physical processes. The Poisson distribution is fully determined by one parameter, which corresponds to the mean value.

These mean SIAs are then converted from the mass to the velocity domain using the kinetic energy equation $$T = \frac{1}{2} m v^2 \Leftrightarrow v = \sqrt{\frac{2T}{m}},$$

and the known acceleration voltage (which fixes T).

To provide a simple semi-empirical average v dependence with the desired properties (i.e. a power law dependence with a local maximum at a dynode-material dependent transition velocity), it is assumed that $SIA \propto av^b \exp(-v/v_0)$, where a, b and $v_0$ are best fit parameters.

The inventors have found that this model is particularly suited to the present context, where it is desired to establish a relatively general model that can be used across multiple different instruments of the same class, and that can be used in the context of analysing a wide range of different analytes. The use of this relatively simple power law model prevents overfitting to the experimental data, which allows the subsequently obtained curve to be used for multiple different instruments of the same design, and for a wide range of different analytes.

Although this form is particularly advantageous, it should be noted that the particular form of the model can be chosen as desired, and embodiments are not limited to the particular form described herein. Other correction functions may give a lesser but acceptable performance, or may give good performance over a restricted mass and/or charge range, or may give good but not necessarily generalizable performance for special kinds of molecular species.

Figure 6:
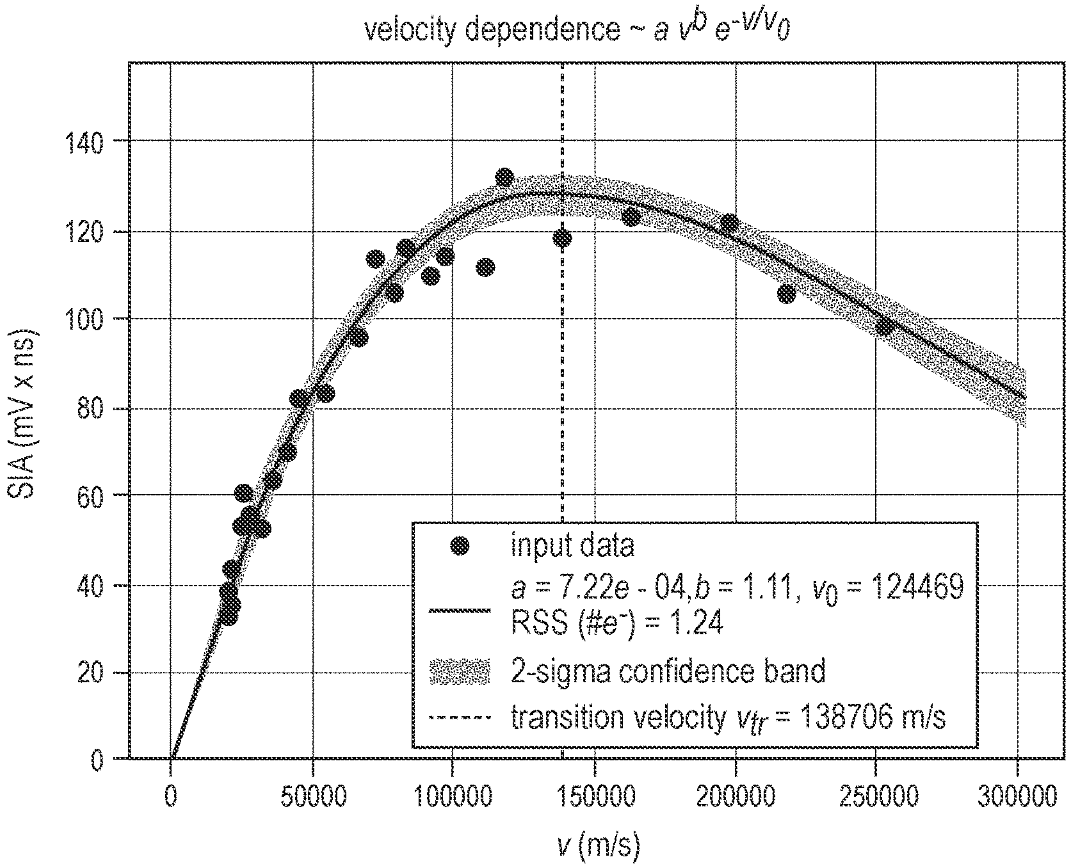
FIG. 6 shows the best fit parameters and regression line for SIAs as function of the incident velocity.

A nonlinear regression of the model is performed on the experimentally obtained data (using suitable regression library functions). The resulting regression line and best fit parameters for SIAs as a function of the incident velocity are depicted in FIG. 6. As shown in FIG. 6, for this example, a=7.22e-4, b=1.11, and $v_0$=124469 (in units corresponding to the depiction of FIG. 6). The transition velocity $v_{tr}$=138706 m/s.

Figure 7:
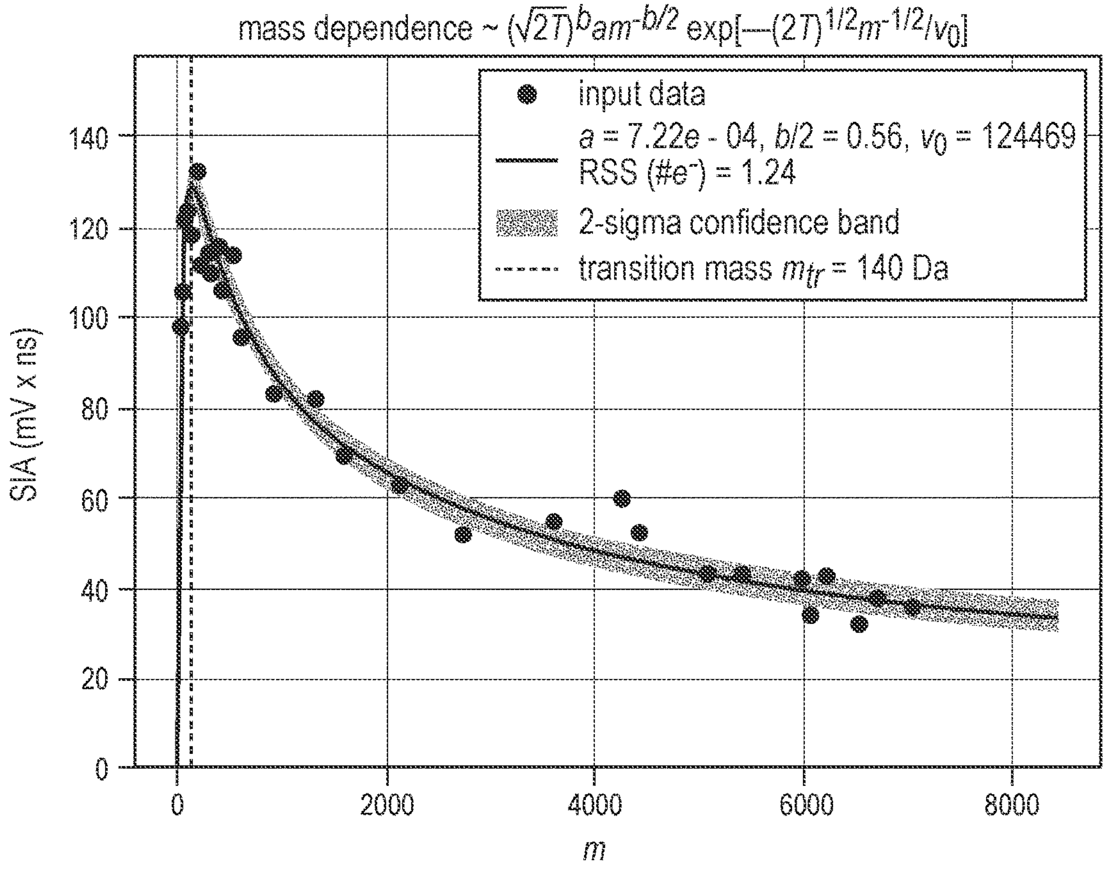
FIG. 7 shows the best fit average SIA as function of mass.

The results are then transformed back to the mass domain to identify the transition mass $m_{Tr}$, and the overall behaviour. In the mass domain, $SIA \propto (\sqrt{2T})^b a m^{-b/2} \exp(-(2T)^{1/2} m^{-1/2}/v_0)$. FIG. 7 shows the resulting best fit average SIA as function of mass. As shown in FIG. 7, for this example, the transition mass $m_{tr}$=140 Da.

Without an additional correction for a non-unity detection efficiency (described below), the number of ions can now be approximately obtained using this curve, e.g. as the measured peak area divided by the best fit SIA(m) for any measured mass of interest.

1.2 Correct for Detection Efficiency

Due to the statistical nature of the ion to electron conversion process and subsequent signal processing chain, a finite probability of zero-electron events exists.

Figure 8A:
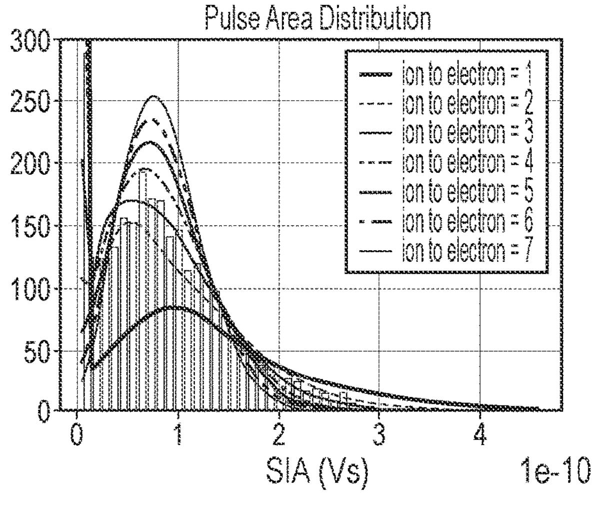
FIG. 8A shows pulse area distribution data together with Monte Carlo simulated outputs having the same average SIA and different ion-to-electron conversion values.

In particular, once one or more secondary electrons have been produced by dynode 51, they are multiplied by one or more stages of electron multiplication 53 in a well-behaved (Poissonian) manner. However, there are occasions where the dynode 51 does not produce a secondary electron in response to an ion. This can be seen in FIG. 8A, which shows simulated SIA distributions. As shown in FIG. 8A, although the bulk of distributions are approximately Gaussian, due to the zero electron events there is delta peak at zero.

This possibility is not accounted for in the FIG. 7 curve. The zero secondary electron events do not produce any measurable signal, and so the mean SIA values of FIG. 7 are likely to be overestimates of the actual mean SIA. Furthermore, the likelihood of zero secondary electron events is higher for masses that provide lower SIAs, because ions at these masses are less efficiently converted into electrons (i.e. produce fewer secondary electrons per ion). Thus, further embodiments employ the following correction scheme.

At a fixed mass $m \approx m_{Tr}$ (ideally close to the transition mass $m_{Tr}$ with a high SEY $$c_0^m),$$

an initial guess for the SEY is estimated by comparison with Monte Carlo (MC) simulations (using the measured SIA values with mean $$a_0^m$$

at this mass).

FIG. 8 shows MC modelling of the initial ion to electron conversion and hence SEY for a given SIA. FIG. 8A shows pulse area distribution data with simulated outputs having the same average SIA and different ion to electron conversion values (between 1 and π electrons). The various curves show MC simulations of the initial electron conversion process, assuming different numbers of secondary electrons are produced in response to a single ion at the dynode 51.

Figure 8B:
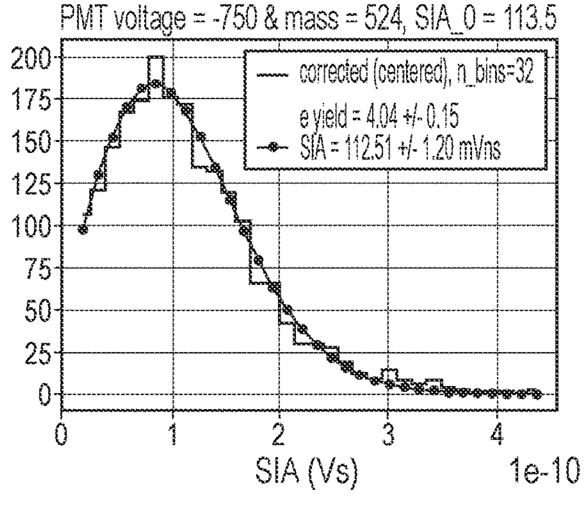
FIG. 8B shows a corresponding best fit to the pulse area distribution data.

FIG. 8B shows a corresponding best fit which can be used to obtain an estimate for the SEY. In the example shown in FIG. 8, the particular stainless-steel dynode is shown to produce on average 4 electrons in response to each single ion.

A first estimate of the uncorrected mean yield at other masses $c_0$ is obtained by $$c_0 \approx \frac{a_0}{a_0^m} c_0^m$$

(where $a_0$ are again the mean SIAs). The $a_0$ (and thus the $c_0$) are overestimated because of the higher fraction of true negatives, so corrected yields c are sought.

If the probability distribution of the ion-electron conversion process is assumed to be Poisson-like (in good approximation), then the efficiency can generally be obtained as:

$$\epsilon := \frac{c}{c_0} = 1 - \exp(-c) = 1 - \exp(-\epsilon\, c_o)$$

This leads to the roots of $\exp(-\epsilon c_o)-(1-\epsilon)=0$ of which the non-trivial solutions are:

$$\epsilon := \frac{W_k[-c_o \exp(-c_0)] + c_0}{c_0}$$

where $W_k$ is the Lambert W function (or Omega function) with branch index k. For real numbers ϵ and $c_0$, the only positive-valued solutions are given by the principal branch k=0. The solutions can therefore straightforwardly be obtained from mathematical software library functions.

Figure 9:
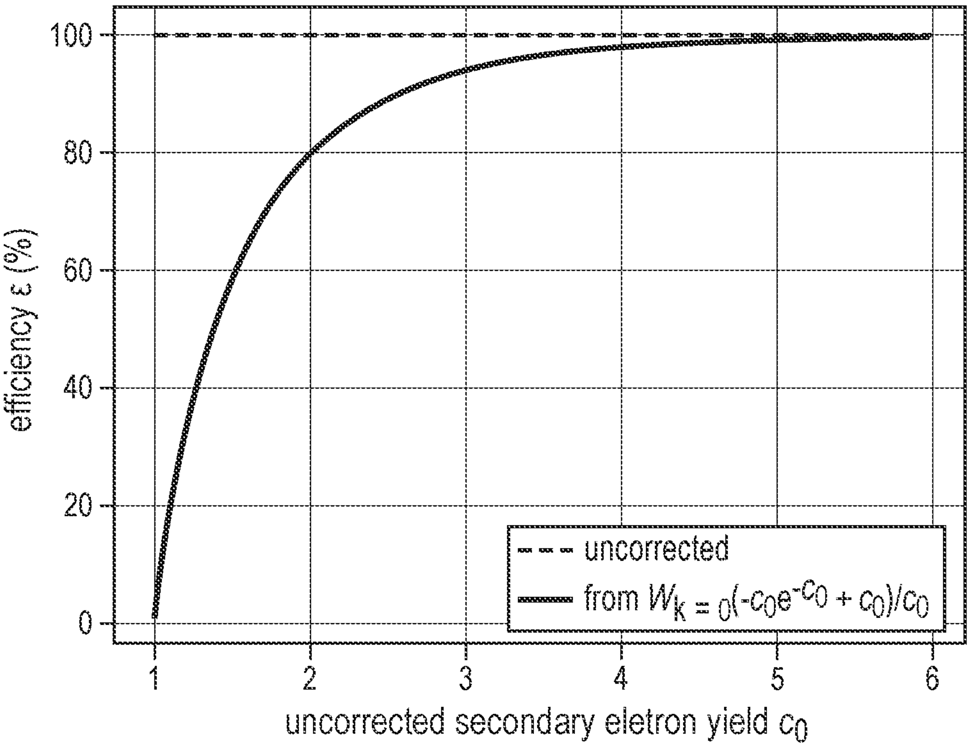
FIG. 9 show a plot of the detection efficiency c as function of SEY.

FIG. 9 shows the resulting detection efficiency curve c as function of the (initially guessed) SEY.

To correct for the starting value discrepancy $$\epsilon^m - \epsilon_0^m$$

(as the initial conversion $$a_0^m \to c_0^m$$

would correspond to $$\epsilon_0^m = 1),$$

all efficiencies can be finally rescaled by a corresponding factor:

$$\epsilon^{final} \approx \frac{\epsilon_0^m}{\epsilon^m}\epsilon$$

The corrected SIA expectation values are finally arrived at as $a \approx \epsilon^{final} a_0$. Note that the efficiency is formally defined as:

$$\epsilon = 1 - P_{e^-}(n = 0) = P_{e^-}(n \geq 1)$$

where $P_{e^-}(n \geq 1)$ is hence the probability to eject one or more electrons.

As these statistical properties are defined on a microscopic scale, n is formally discretized to positive integers and $\epsilon(c_0)$ correctly sharply drops to zero (with a non-continuous derivative) for n<1.

When applied to macroscopically averaged SIAs/SEYs, any values with an initial estimate $c_0<1$ will be projected to zero. This represents an unphysical border case (as a macroscopically averaged SEY cannot fall below 1 without the zero-electron contributions, which are by definition removed via the application of the microscopically defined E coefficient) and will lead to strongly biased fit coefficients. In practice, this case should be ruled out by sanity checking the consistency of the full iteration cycle and/or a correction of the $\epsilon(c_0)$ relationship that takes these macroscopic effects into account.

Figure 10:
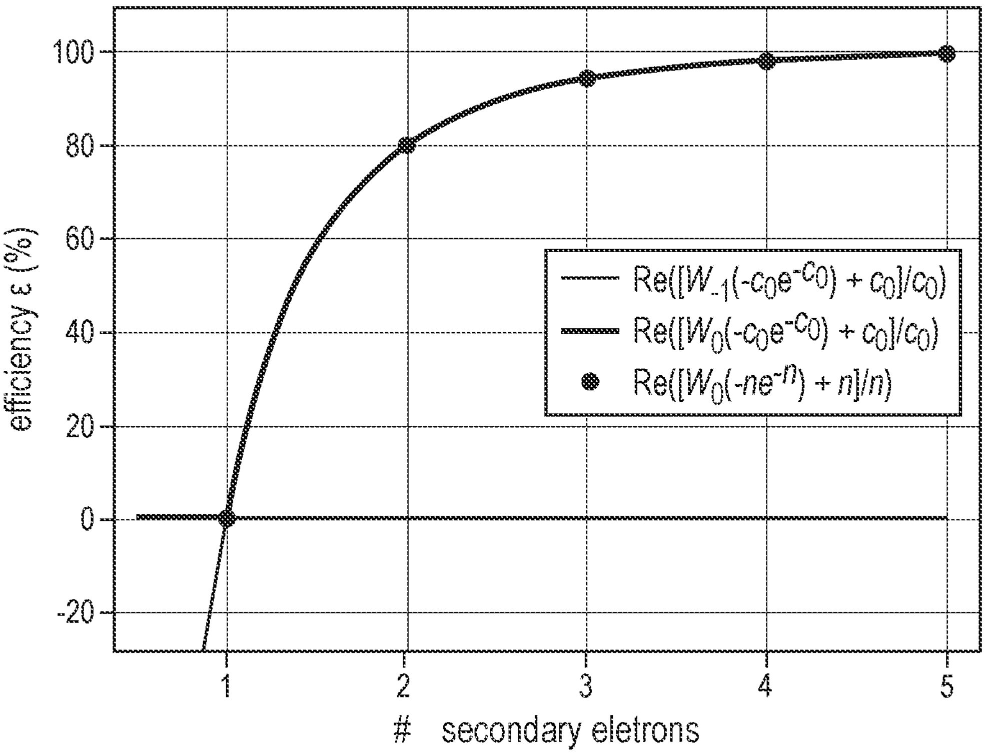
FIG. 10 shows the two real valued branches of the efficiency solution around $c_0=1$ (macroscopic case) and n=1 (microscopic case)

FIG. 10 shows the two real valued branches of the efficiency solution around $c_0=1$ (macroscopic case) and n=1 (microscopic case).

When applying the full correction scheme to the initially obtained SIA values, a significantly modified velocity/mass dependence of the SIA data is obtained, which underlines the impact of the complete correction scheme as presented here. This can also be understood from the initial mass dependency of the SIAs, as higher masses have lower SIAs and, accordingly, lower SEYs and lower conversion efficiencies.

Figure 11:
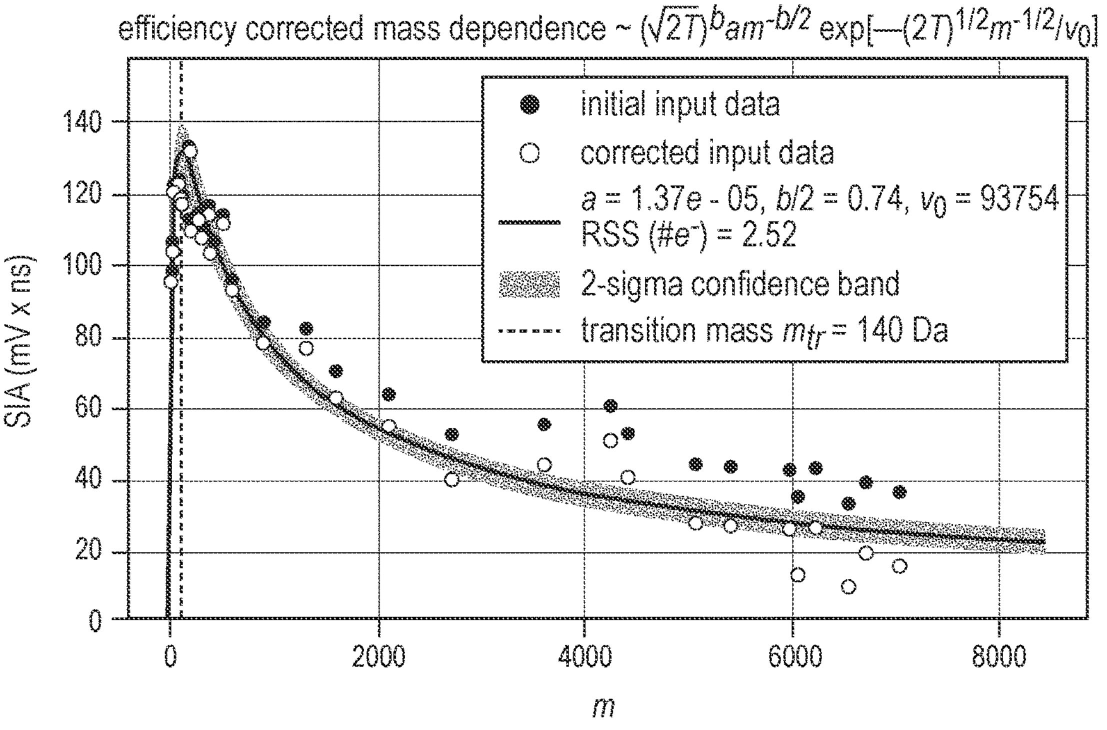
FIG. 11 shows the initial SIA data (black dots) and efficiency corrected SIA data (red dots), together with modified best fit parameters and a modified regression line.

FIG. 11 shows the initial SIA data (black dots) and the efficiency corrected SIA data (red dots), as well as the new best fit parameters and new regression line. With the correction for zero-electron events, the power law exponent b/2 of the mass dependency changes significantly (in this example from $$\frac{b}{2} \approx 0.56 \text{ to } \frac{b}{2} \approx 0.74).$$

More specifically, as shown in FIG. 11, for this example, a=1.37e-5, b/2=0.74, and $v_0$=93754 (in units corresponding to the depiction of FIG. 11). The transition mass $m_t$=140 Da.

2. Charge Dependence of the SIAs

The following describes an additional correction for the dependence of the SIAs on charge state.

Figure 12A:
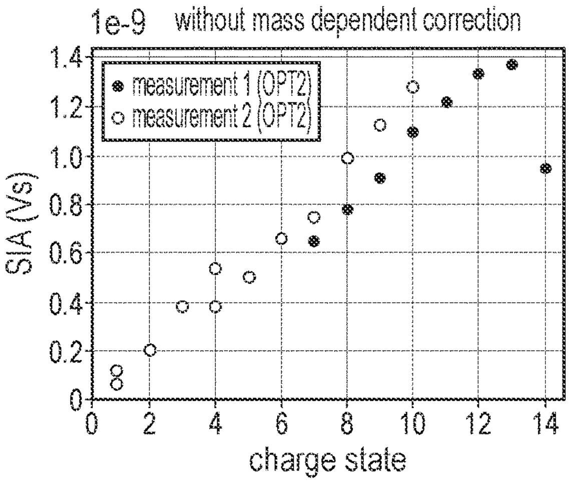
FIG. 12A shows the charge dependence of measured SIAs without mass dependent corrections.

FIG. 12A shows charge dependence of measured SIAs without mass dependent corrections, over a mass range of approximately m≈600-1300 Da. This charge dependent SIA data was obtained from two series of measurements on an instrument of the type depicted in FIG. 2 (the mass degree of freedom is not shown for reasons of clarity). A very emphasized dependence of the SIA on the charge state with a seemingly linear average trend can be seen.

Figure 12B:
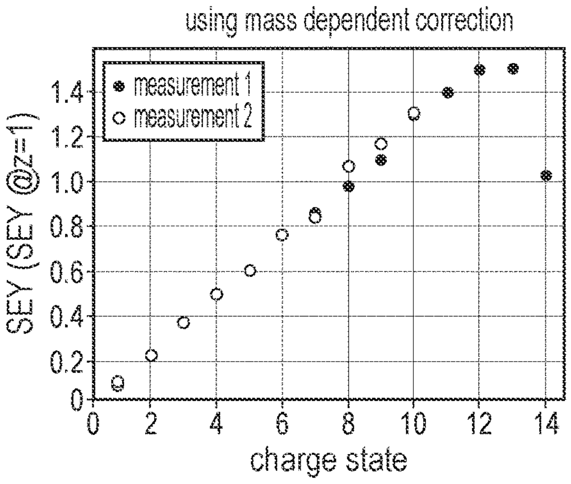
FIG. 12B shows the charge dependence of the same data set including the mass dependent correction function.

FIG. 12B shows the same data, but with the mass dependent corrections from the previous section applied. Additionally, the MC-simulation based ion-electron conversion estimate is used to obtain an estimation for the number of secondary electrons involved (the use of the mass correction curve corresponds to a normalization of the SEY to a common z=1 curve). Clearly, the linear trend is even more emphasized.

Thus, in embodiments, a linear dependence of the SIA on charge is included in the correction function.

3. Use of the Correction Function

The correction function derived in the manner described above can be used as a global correction function, i.e. for all individual analysers of the same class, e.g. for all analysers of the type depicted in FIG. 2 that have at least the same instrument geometry, use the same dynode material(s), and are configured such that ions arrive at the detector with the same incident angle, etc. The global correction function is used to derive a correction function for each individual analyser by scaling the global correction function to each individual analyser. This may involve measuring a mean single ion area (SIA) for ions of a particular mass, e.g. where the mass is at or close to close to the transition mass, and then scaling the global correction function based on the measured mean SIA. This may comprise scaling the SIA axis of the global correction function such that the value of the scaled correction function at the particular mass is equal to the determined mean SIA value for the analyser at the particular mass.

Figure 13:
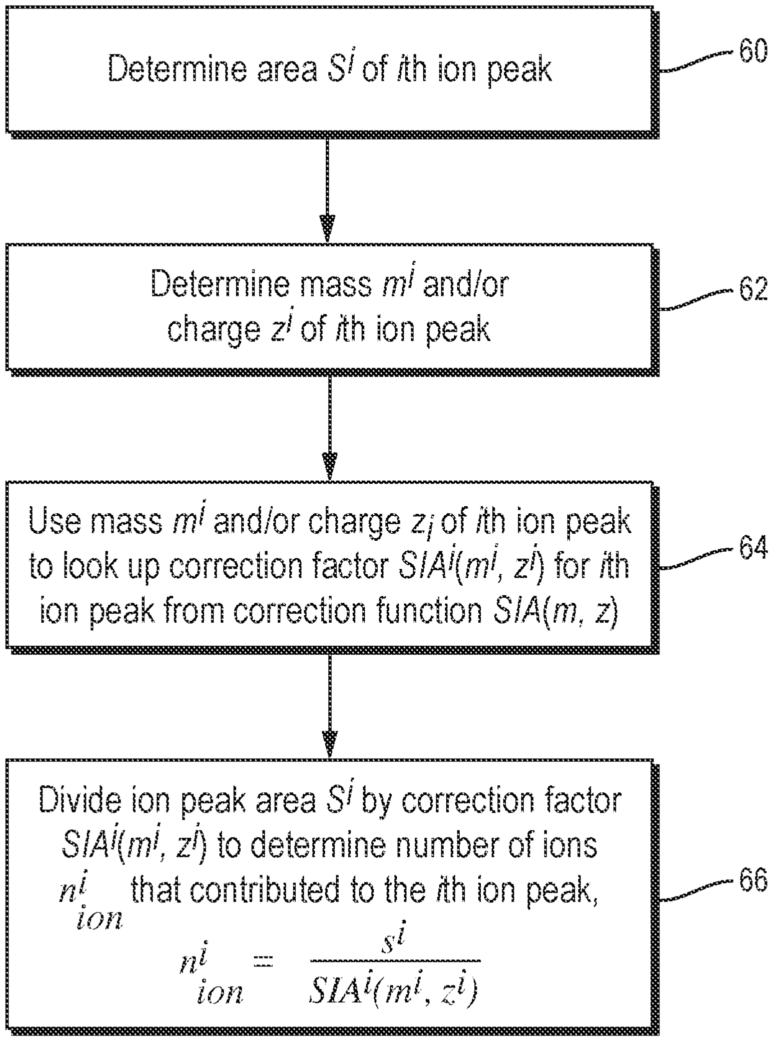
FIG. 13 shows a method of determining the number of ions that contributed to an ion peak in accordance with embodiments.

FIG. 13 illustrates schematically a method of determining the number of ions that contributed to an ion peak in accordance with embodiments.

As shown in FIG. 13, a particular ("ith") ion peak is identified in the digitised signal produced by the detector 38, and its peak area $S^i$ is initially determined (step 60), e.g. by integrating the area of the signal under the peak. The mass $m^i$ of the ith ion peak is also determined, optionally together with its charge $z^i$ (step 62). This can be done as desired. For example, the mass to charge ratio (m/z) of an ion peak can be determined from its arrival time, its charge $z$ can be determined from the context of the experiment and/or by considering related isotope patterns and/or adjacent charge state ion peaks, and its mass m can be determined from its m/z and charge $z$.

Next, the mass $m^i$ and/or charge $z_i$ of ith ion peak is or are used to look up a correction factor $SIA^i(m^i, z)$ for the ion peak from the (scaled) correction function $SIA(m, z)$ (which is produced in the manner described above) (step 64). Finally, the number of ions $$n_{ion}^i$$

that contributed to the ith ion peak is determined by dividing the ion peak area $S^i$ by the correction factor $SIA^i(m^i, z^i)$, i.e.

$$n^i_{ion} = \frac{S^i}{SIA^i(m^i, z^i)} \text{ (step 66).}$$

It should be noted in this regard that the peak area is known to linearly increases with the number of ions in the peak. Saturation effects may be corrected for, e.g. using any suitable existing techniques.

This process of determining the number of ions that contributed to an ion peak can be repeated for one or more or each other ion peak in the signal. The so-estimated number of ions that contributed to each ion peak in the signal can then be summed to estimate the total number of ions that contributed to the signal, e.g. to estimate the total number of ions in the packet(s) of ions that generated the signal.

This information can be used for quantification, e.g. of particular analytes in the sample.

Additionally or alternatively, the information can be used for so-called automatic gain control (AGC) methods. As described above, in the time-of-flight mass analyser of the type depicted in FIG. 2, packets of ions are accumulated in an ion trap 33 before being injected from the ion trap 33 into a drift region between the mirrors 31, 32. In these analysers, it is necessary to precisely control the total number of ions in each packet of ions accumulated in the ion trap 33, e.g. to optimise the number of ions to be below, but as close as possible to, a limit for the ion trap 33 such as a space-charge limit for the ion trap 33. This is typically done using so-called automatic gain control (AGC) methods, which rely on precise measurements or estimations of the number of ions in a packet of ions to control the number of ions in a subsequent packet of ions.

Embodiments allow the total number of ions in a packet of ions that generated a signal to be estimated accurately by considering only the signal. Each packet of ions can include ions spread over a wide range of masses and charge (with a wide range of corresponding SIAs), and so correcting for the dependence of ion area upon mass and/or charge provides significant improvements to the accuracy of estimations of the number of ions in a packet of ions, and to the AGC method.

Figure 14A:
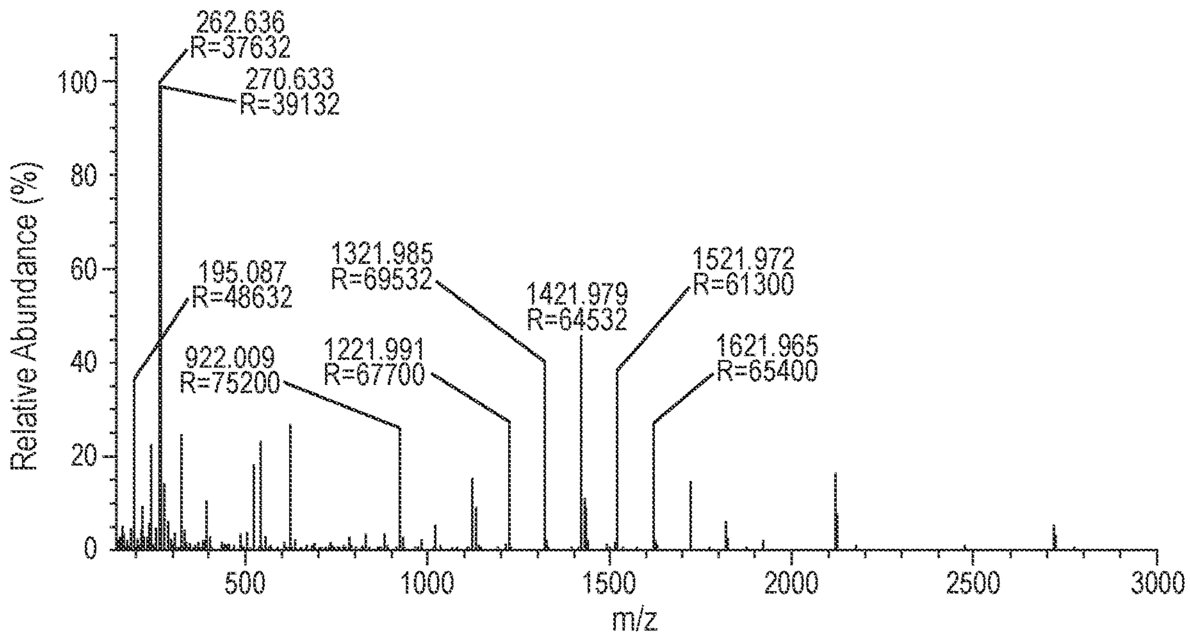
FIG. 14A shows a mass spectrum of Pierce™ Flexmix™ calibration solution obtained using a mass analyser of the type depicted in FIG. 2 without m/z dependent single ion area correction.
Figure 14B:
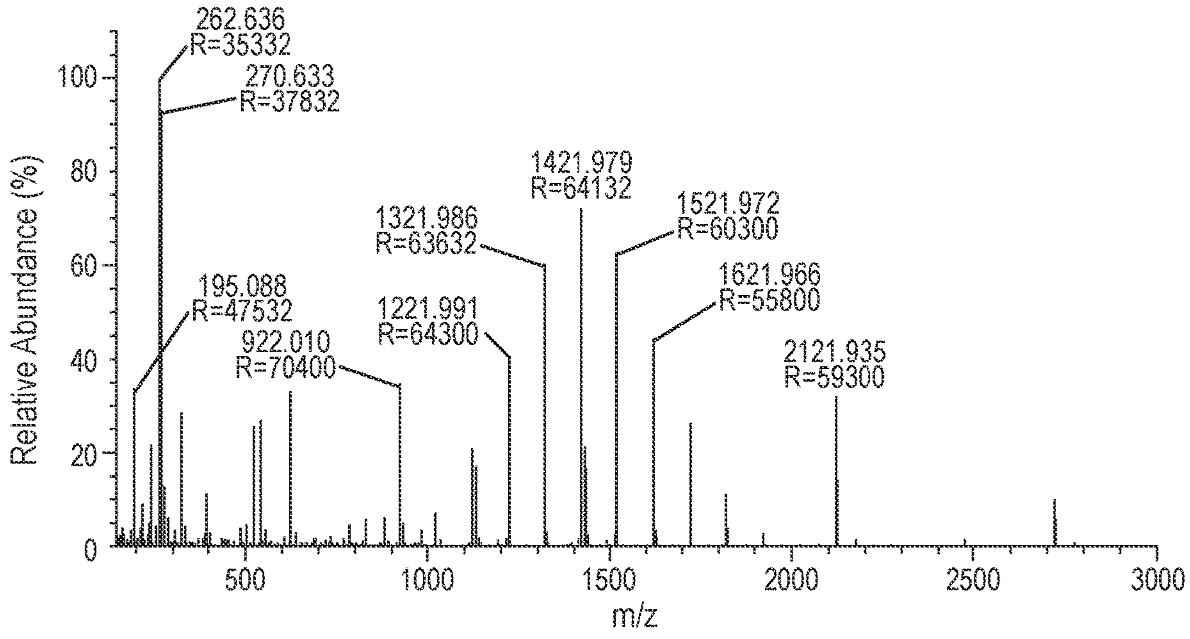
FIG. 14B shows a corresponding spectrum with m/z dependent single ion area correction.

FIGS. 14A and 14B compare Pierce™ Flexmix™ calibration solution mass spectra with a mass range of 150-3000. The spectrum in FIG. 14B has the m/z dependent single ion area correction applied, whilst the spectrum in FIG. 14A does not. It can be observed that the higher m/z species are relatively diminished without the correction, which would have the effect of substantially hindering any attempt to quantify them.

It will be appreciated from the above that embodiments provide a comprehensive and self-contained scheme that can be used to obtain an improved estimate of the number of initial ions contributing to an ion peak. Monte Carlo simulations and statistical corrections are used to obtain a heuristically motivated correction scheme over a large mass (and charge state) domain. This avoids the need to resort to first-principle based models, of which the generalizability to a broad range of life science applications is infeasible.

Although the present invention has been described with reference to various embodiments, it will be understood that various changes may be made without departing from the scope of the invention as set out in the accompanying claims.

The invention claimed is:

1. A method of analysing a signal generated by a mass analyser, the method comprising:

receiving a signal generated by the mass analyser, the signal including one or more ion peaks;

determining the area of a first ion peak of the one or more ion peaks; and estimating the number of ions that contributed to the first ion peak by: (i) determining a correction to be applied to the area of the first ion peak from a correction function, wherein the correction function describes a relationship between average single ion area and ion mass (m), mass-to-charge ratio (m/$z$) and/or charge ($z$) for the mass analyser; and (ii) applying the correction to the area of the first ion peak.

2. The method of claim 1, wherein the correction function describes the relationship between average single ion area and ion mass or m/z for the analyser across a m/z range, wherein the m/z range is from about 25, 50, 75 or 100, to about 6000, 8000, 10,000, or 15,000.

3. The method of claim 2, wherein a mass or m/z dependence of the correction function is continuous across the m/z range.

4. The method of claim 1, wherein:

a mass or m/z dependence of the correction function has a maximum at a transition mass, increases with increasing mass at masses below the transition mass, and decreases with increasing mass at masses above the transition mass.

5. The method of claim 4, wherein the analyser includes an ion detector comprising at least a dynode, and wherein the transition mass depends on one or more properties of the dynode.

6. The method of claim 1, wherein a mass or m/z dependence of the correction function has the form $(\sqrt{2T})^b am^{-b/2} \exp(-(2T)^{1/2}m^{-1/2}/v_0)$ or $av^b \exp(-v/v_0)$, where T is the kinetic energy of an ion, m is its mass, v is its velocity, and a, b and $v_0$ are best fit parameters.

7. The method of claim 1, wherein the correction function describes a relationship between average single ion area and charge for the analyser across a charge range from 1 elementary charge to 10 or more elementary charges.

8. The method of claim 7, wherein a charge dependence of the correction function varies linearly with charge.

9. The method of claim 1, where the correction function for the analyser is obtained by scaling a global correction function.

10. The method of claim 1, further comprising:

determining the area of one or more further ion peaks of the one or more ion peaks; and estimating the number of ions that contributed to each of the one or more further ion peaks by, for each of the one or more further ion peaks: (i) determining a correction to be applied to the area of the ion peak from the correction function; and (ii) applying the correction to the area of the ion peak.

11. The method of claim 1, wherein the correction function or a global correction function is determined by fitting a model to measured single ion area (SIA) data.

12. The method of claim 11, wherein the single ion area (SIA) data is corrected SIA data derived from raw SIA data by correcting the raw SIA data for detector efficiency.

13. A method of operating an analytical instrument that comprises an ion source and a mass analyser, the method comprising:

generating ions in the ion source;

analysing the ions with the mass analyser so as to generate a signal; and analysing the signal using the method of claim 1.

14. The method of claim 1, wherein the mass analyser is a time-of-flight (ToF) mass analyser.

15. The method of claim 14, wherein the time-of-flight mass analyser includes an ion trap, and wherein the method comprises:

accumulating a first packet of ions in the ion trap;

analysing the first packet of ions so as to generate a first signal;

analysing the first signal so as to estimate the total number of ions in the first packet of ions; and accumulating a second packet of ions in the ion trap;

wherein the estimated total number of ions in the first packet of ions is used to control the total number of ions in the second packet of ions.

16. A non-transitory computer readable storage medium storing computer software code which when executed on a processor performs the method of claim 1.

17. A control system for an analytical instrument, the control system configured to cause the analytical instrument to perform the method of claim 1.

18. An analytical instrument comprising an ion analyser and the control system of claim 17.

19. A method of determining a correction function for a mass analyser, the method comprising:

using a mass analyser to analyse a plurality of single ions, wherein the plurality of single ions includes ions having mass, m/z, and/or charge spread across most or all of mass, m/z, and/or charge range(s) of interest for the analyser;

generating single ion area (SIA) data by determining the area of each ion peak of a plurality of ion peaks generated by the analyser in response to analysing the plurality of single ions; and determining a correction function by fitting a model to the SIA data.

20. An analytical instrument comprising:

a mass analyser; and a control system configured to:

receive a signal generated by the mass analyser, the signal including one or more ion peaks;

determine the area of a first ion peak of the one or more ion peaks; and estimate the number of ions that contributed to the first ion peak by: (i) determining a correction to be applied to the area of the first ion peak from a correction function, wherein the correction function describes a relationship between average single ion area and ion mass, mass-to-charge ratio, and/or charge for the mass analyser; and (ii) applying the correction to the area of the first ion peak.

21. The analytical instrument of claim 20, wherein the mass analyser is a time-of-flight mass analyser comprising an ion trap, and the instrument is configured to:

accumulate a first packet of ions in the ion trap;

analyse the first packet of ions so as to generate a first signal;

estimate the total number of ions in the first packet of ions; and use the estimated total number of ions in the first packet of ions to control the number of ions in a second packet of ions accumulated in the ion trap.

* * * * *